US012255678B2

United States Patent
De Ruijter et al.

(10) Patent No.: US 12,255,678 B2
(45) Date of Patent: Mar. 18, 2025

(54) INTERRUPT DRIVEN RECONFIGURATION OF CONFIGURABLE RECEIVER FRONT END MODULE

(71) Applicant: Silicon Laboratories Inc., Austin, TX (US)

(72) Inventors: Hendricus De Ruijter, San Jose, CA (US); Thomas Edward Voor, Cedar Park, TX (US); Jeffrey L. Sonntag, Greenville, SC (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/897,693

(22) Filed: Aug. 29, 2022

(65) Prior Publication Data

US 2023/0421197 A1 Dec. 28, 2023

Related U.S. Application Data

(63) Continuation-in-part of application No. 17/851,534, filed on Jun. 28, 2022.

(51) Int. Cl.
| | |
|---|---|
| G06F 13/24 | (2006.01) |
| G06F 13/40 | (2006.01) |
| H04B 1/401 | (2015.01) |
| H04B 5/48 | (2024.01) |

(52) U.S. Cl.
CPC ............ H04B 1/401 (2013.01); H04B 5/48 (2024.01)

(58) Field of Classification Search
None
See application file for complete search history.

(56) References Cited

U.S. PATENT DOCUMENTS

| | | | | |
|---|---|---|---|---|
| 5,343,094 A | * | 8/1994 | Nguyen | H03K 5/2481 326/27 |
| 7,151,759 B1 | | 12/2006 | Ryan et al. | |
| 9,154,166 B2 | * | 10/2015 | Darabi | H04B 1/52 |
| 9,793,871 B1 | | 10/2017 | Kim et al. | |
| 10,056,875 B1 | * | 8/2018 | Beaudin | H03F 3/72 |
| 11,337,162 B1 | | 5/2022 | Cariou et al. | |
| 11,901,924 B2 | * | 2/2024 | Voor | H04B 1/04 |

(Continued)

OTHER PUBLICATIONS

L. Bisdounis et al., "Low-power system-on-chip architecture for wireless LANs", Jan. 2004, IEEE (Year: 2004).*

(Continued)

*Primary Examiner* — Hyun Nam
(74) *Attorney, Agent, or Firm* — Trop, Pruner & Hu, P.C.

(57) ABSTRACT

In one aspect, a method comprises: receiving, in a controller of a wireless device, at least one of a first interrupt or a second interrupt, where: the first interrupt is to indicate that a receive radio frequency (RF) signal received in a front end circuit of the wireless device is overloading at least a low noise amplifier (LNA) of the front end circuit; and the second interrupt is to indicate that the receive RF signal is overloading at least a passive network of a system on chip (SoC) of the wireless device; and in response to the at least one of the first interrupt or the second interrupt, reconfiguring the front end circuit from a first mode into a second mode, where a relative order of a receiver RF signal processing path is different in the first mode than in the second mode.

19 Claims, 14 Drawing Sheets

(56) References Cited

U.S. PATENT DOCUMENTS

| | | | | |
|---|---|---|---|---|
| 2004/0140719 | A1* | 7/2004 | Vulih | H02J 9/04 |
| | | | | 307/80 |
| 2008/0182534 | A1* | 7/2008 | Bonesteel | H04H 60/51 |
| | | | | 455/161.3 |
| 2013/0135043 | A1 | 5/2013 | Hietala et al. | |
| 2013/0182785 | A1* | 7/2013 | Koifman | H04W 72/0453 |
| | | | | 375/267 |
| 2013/0207473 | A1* | 8/2013 | Jain | H02J 9/062 |
| | | | | 307/65 |
| 2015/0270744 | A1* | 9/2015 | Lacarnoy | H02J 9/061 |
| | | | | 307/66 |
| 2016/0277045 | A1 | 9/2016 | Langer | |
| 2016/0301369 | A1* | 10/2016 | Heaney | H03F 3/195 |
| 2016/0337971 | A1* | 11/2016 | Bhargava | H04W 52/0216 |
| 2017/0279415 | A1* | 9/2017 | Wallis | H03F 3/213 |
| 2018/0014266 | A1 | 1/2018 | Chen | |
| 2018/0026592 | A1* | 1/2018 | Wallis | H03F 1/523 |
| | | | | 330/302 |
| 2018/0192379 | A1 | 7/2018 | Gross et al. | |
| 2018/0226367 | A1* | 8/2018 | Babcock | H04B 1/40 |
| 2018/0226932 | A1* | 8/2018 | Beaudin | H04W 52/0261 |
| 2020/0067559 | A1* | 2/2020 | Wich | H04B 1/44 |
| 2021/0218434 | A1 | 7/2021 | Pehlke | |
| 2021/0320081 | A1 | 10/2021 | Babcock et al. | |
| 2022/0182084 | A1 | 6/2022 | King et al. | |
| 2022/0214385 | A1 | 7/2022 | Hecht et al. | |
| 2022/0345098 | A1* | 10/2022 | Panseri | H04B 1/40 |
| 2022/0345170 | A1* | 10/2022 | Panseri | H04B 1/40 |
| 2023/0421183 | A1* | 12/2023 | Voor | H04B 1/04 |
| 2023/0421191 | A1* | 12/2023 | Voor | H04B 1/16 |
| 2023/0421192 | A1* | 12/2023 | De Ruijter | H04B 1/16 |
| 2023/0421193 | A1* | 12/2023 | De Ruijter | H04B 1/16 |
| 2023/0421194 | A1* | 12/2023 | Voor | H04B 1/18 |
| 2023/0421197 | A1* | 12/2023 | De Ruijter | H04B 1/18 |
| 2023/0422053 | A1* | 12/2023 | Voor | H04W 24/02 |

OTHER PUBLICATIONS

United States Patent Office, Non-Final Office Action dated Jul. 19, 2023 in U.S. Appl. No. 17/897,706 (10 pages).

United States Patent Office, Non-Final Office Action dated Dec. 7, 2023 in U.S. Appl. No. 17/851,534 (26 pages).

Silicon Labs, "MGM12P Wireless Gecko Multi-Protocol Module Data Sheet," Date Unknown, Rev. 1.4, 100 Pages.

U.S. Appl. No. 17/851,534, filed Jun. 28, 2022, entitled "Providing a Single Filter for Transmit and Receive Modes" in the name of Thomas Edward Voor.

U.S. Appl. No. 17/897,620, filed Aug. 29, 2022, entitled "Configurable Receiver Front End Module Having Configurable Detection Capabilities" in the name of Thomas Edward Voor.

U.S. Appl. No. 17/897,637, filed Aug. 29, 2022, entitled "Control of Configurable Receiver Front End Module Based at Least in Part on Signal Metric Information" in the name of Thomas Edward Voor.

U.S. Appl. No. 17/897,652, filed Aug. 29, 2022, entitled "Initialization of Configurable Receiver Front End Module Into a Selected Mode" in the name of Hendricus De Ruijter.

U.S. Appl. No. 17/897,671, filed Aug. 29, 2022, entitled "Reconfiguration of Configurable Receiver Front End Module Between Plurality of Modes" in the name of Hendricus De Ruijter.

U.S. Appl. No. 17/897,706, filed Aug. 29, 2022, entitled "Power Variation Correction for a Transmitter" in the name of Thomas Edward Voor.

U.S. Appl. No. 17/897,721, filed Aug. 29, 2022, entitled "Central Entity Update of Configurable Receiver Front End Module Between Static Modes" in the name of Thomas Edward Voor.

United States Patent Office, Notice of Allowance dated Oct. 4, 2023 in U.S. Appl. No. 17/897,706 (9 pages).

United States Patent Office, Reply to Office Action filed Sep. 26, 2023 in U.S. Appl. No. 17/897,706 (7 pages).

United States Patent Office, Notice of Allowance dated Oct. 13, 2023 in U.S. Appl. No. 17/897,652 (17 pages).

United States Patent Office, Reply to Final Office Action filed Aug. 22, 2024 in U.S. Appl. No. 17/851,534 (8 pages).

United States Patent Office, Reply to Office Action dated Mar. 7, 2024 in U.S. Appl. No. 17/851,534 (8 pages).

United States Patent Office, Final Office Action dated Jun. 27, 2024 in U.S. Appl. No. 17/851,534 (22 pages).

United States Patent Office, Advisory Action dated Sep. 5, 2024 in U.S. Appl. No. 17/851,534 (4 pages).

United States Patent Office, Notice of Allowance dated Dec. 4, 2024 in U.S. Appl. No. 17/851,534 (13 pages).

* cited by examiner

INTERRUPT DRIVEN RECONFIGURATION OF CONFIGURABLE RECEIVER FRONT END MODULE

CROSS-REFERENCE TO RELATED APPLICATION

The present application is a continuation-in-part of U.S. patent application Ser. No. 17/851,534, filed on Jun. 28, 2022, the content of which is hereby incorporated by reference.

BACKGROUND

Many small wireless devices include multiple integrated circuits and other components, all of which are typically adapted on a circuit board. In many instances, transceiver circuitry that performs transmit and receive functions couple to multiple off-chip components including filters, amplifiers and so forth. In many cases, separate off-chip components are required. For example, there may be a first off-chip filter to couple to a transmit path and a separate second off-chip filter to couple to a receive path. In this way, circuit board area is undesirably consumed and bill of material costs increase.

In addition, for optimum operation depending on an environment in which the wireless device is located, oftentimes particular radio solutions are designed to statically operate in a single environment, which prevents flexibility. Instead in devices that can dynamically adapt to an environment, there can be difficulties in identifying an optimal configuration and moving between different modes of operation.

SUMMARY OF THE INVENTION

In one aspect, a method comprises: receiving, in a controller of a wireless device, at least one of a first interrupt or a second interrupt, where: the first interrupt is to indicate that a receive radio frequency (RF) signal received in a front end circuit of the wireless device is overloading at least a low noise amplifier (LNA) of the front end circuit; and the second interrupt is to indicate that the receive RF signal is overloading at least a passive network of a system on chip (SoC) of the wireless device; and in response to the at least one of the first interrupt or the second interrupt, reconfiguring the front end circuit from a first mode into a second mode, where a relative order of a receiver RF signal processing path is different in the first mode than in the second mode.

In an embodiment, the method further comprises in response to the first interrupt, reconfiguring the front end circuit from the first mode comprising a rural mode in which an input to the LNA is coupled an antenna to a second mode comprising an urban mode in which the input to the LNA is coupled to an RF filter. The method may further comprise: receiving, in the controller of the wireless device, the second interrupt when the front end circuit is in the second mode; and in response to the second interrupt, reconfiguring the front end circuit from the second mode to a third mode comprising a bypass mode in which the LNA is bypassed.

In an embodiment, the method further comprises in response to the second interrupt, reconfiguring the front end circuit from a rural mode in which an input to the LNA is coupled an antenna to a third mode comprising a bypass mode in which the LNA is bypassed. The method also may include receiving the first interrupt from a comparator, the comparator to generate the first interrupt when power level information regarding the receive RF signal exceeds a first threshold. The method also may include receiving the second interrupt when power level information regarding the receive RF signal received from a detector coupled to the passive network exceeds a second threshold.

In an embodiment, the method further comprises in response to receiving the first interrupt and the second interrupt, prioritizing the second interrupt, and reconfiguring the front end circuit from the first mode to a third mode in which the LNA is bypassed. The method also may include: receiving, in the controller of the wireless device, the first interrupt when the front end circuit is in the second mode; in response to the first interrupt, resetting a timeout period; and after the timeout period, reconfiguring the front end circuit from the second mode to the first mode.

In another aspect, a method includes: configuring a front end circuit of a wireless device into a first mode in which a LNA is included in a receiver RF signal processing path; and reconfiguring the front end circuit into a second mode in which the LNA is bypassed, based at least in part on an overload condition in an RF circuit of a SoC of the wireless device, the RF circuit of the SoC coupled to receive a receive RF signal from the front end circuit.

In an embodiment, the method further comprises reconfiguring the front end circuit from the second mode to the first mode after a timeout period. The method also may include reconfiguring the front end circuit into a third mode in which the LNA is located at a different relative position in the receiver RF signal processing path than in the first mode, based at least in part on an overload condition in the front end circuit. The method may further include: receiving, in a controller of the SoC, a first interrupt in response to the power level of the receive RF signal exceeding a first threshold; and reconfiguring the front end circuit into the third mode in response to the first interrupt.

In an embodiment, the method further comprises: receiving, in the SoC, a power level of the receive RF signal and in response to the power level of the receive RF signal exceeding a first threshold, reconfiguring the front end circuit from the first mode into a third mode in which an input of the LNA is coupled to a RF filter of the receiver RF signal processing path; and receiving, in the SoC, the power level of the receive RF signal and in response to the power level of the receive RF signal exceeding a second threshold different from the first threshold, reconfiguring the front end circuit from the third mode into the second mode. Configuring the front end circuit into the first mode comprising causing an input of the LNA to be coupled to an antenna.

In another embodiment, a computer readable medium (e.g., a non-transitory storage medium) includes instructions and/or data that, when executed, cause a device to perform the method of any of the above embodiments. In yet another embodiment, an apparatus comprises means for performing the method of any one of the above embodiments.

In another aspect, a wireless device comprises: a first integrated circuit comprising a RF front end module and a second integrated circuit coupled to the first integrated circuit. The RF front end module may include: a transmit path to receive, process and output a transmit RF signal, the transmit path comprising a power amplifier; a receive path to receive, process and output a receive RF signal, the receive path comprising a LNA; switching circuitry coupled to the transmit path and the receive path; a control circuit coupled to the switching circuitry. The control circuit may control the switching circuitry to configure the receive path for operation in one of a plurality of modes. The second integrated circuit may include a controller to: in response to a first interrupt, configure the receive path of the first integrated circuit into a second mode in which a receiver RF signal processing path has a second sensitivity level; maintain a timeout time during operation in the second mode; and after the timeout time, reconfigure the receive path of the first integrated circuit from the second mode to a first mode having a first sensitivity level, the first sensitivity level greater than the second sensitivity level.

In an embodiment, the controller is to cause the control circuit to configure the receive path for the operation in the second mode in response to an overload of the LNA, where in the second mode the receive path comprises an RF filter having an output coupled to an input of the LNA. The controller may receive the first interrupt to indicate the overload of the LNA, the second integrated circuit comprising a comparator to compare a power level of the receive RF signal to a comparison signal and generate the first interrupt in response to the power level of the receive RF signal exceeding the comparison signal.

In an embodiment, the controller is to cause the control circuit to configure the receive path for the operation in a third mode in which the LNA is bypassed in response to an overload of an RF circuit of the second integrated circuit. The controller may receive a second interrupt to indicate the overload of the RF circuit, the second integrated circuit comprising a detector coupled to the RF circuit to detect the overload of the RF circuit and generate the second interrupt in response to the detection of the overload of the RF circuit. The controller, in response to: the first interrupt, is to configure the receive path for the operation in the second mode in which an LNA is coupled to receive the receive RF signal from an RF filter; a second interrupt, is to configure the receive path for the operation in a third mode in which the LNA is bypassed; the first interrupt and the second interrupt, is to configure the receive path for the operation in the third mode.

DETAILED DESCRIPTION

Figure 1:
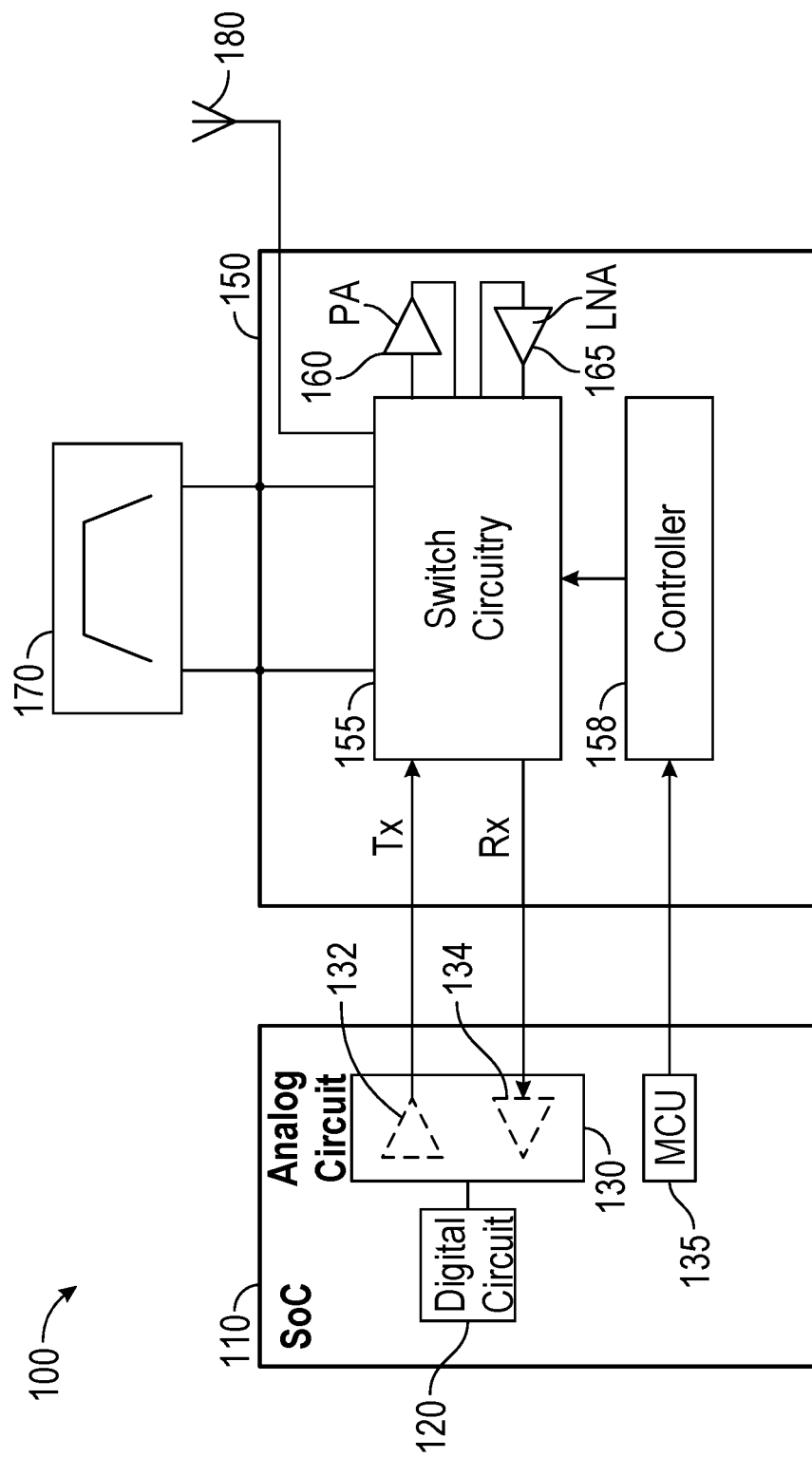
FIG. 1 is a high level block diagram of a portion of a device incorporating an embodiment.

In various embodiments, an integrated circuit having transceiver circuitry may further include switch circuitry to enable both a transmit path and a receive path to use a single off-chip filter. The switch circuitry may be dynamically controlled depending on mode of operation (e.g., receive or transmit) to programmably and dynamically direct appropriate receive or transmit signals to such off-chip filter. In a transmit direction, this single off-chip filter may couple between a transmit driver and a transmit power amplifier. And in a receive direction, this single off-chip filter may couple between a receive port and an on-chip amplifier. Such switch circuitry may be implemented with minimal insertion loss that has minimal effect on system performance.

With embodiments, a single off-chip filter may provide sufficient suppression of spurs for transmit signals, and in a receive mode may provide filtering of blocking signals and enhancing immunity. Although embodiments are not limited in this regard, implementations of a transceiver that include such switching circuitry may be used in a variety of different device types including sub-gigahertz (GHz) industrial scientific and medical (ISM) devices, such as may operate at a frequency range of somewhere between approximately 850 megahertz (MHz) and 925 MHz.

In some implementations, there may be multiple receive modes, including a so-called rural mode which may be used in an environment in which there are relatively few blocking or other interfering signals. In a rural mode, switching circuitry may be controlled to provide a receive path in which an incoming RF signal received via an antenna is provided first to a low noise amplifier (LNA) and then to an off-chip filter. Instead in a so-called urban mode, which may be active when a device is in an urban or other highly congested environment in which there may be potentially many blocking or interfering signals, switching circuitry may be controlled such that an incoming RF signal received via an antenna is first provided to the off-chip filter before being provided to the LNA. A further receive mode may be a bypass mode in which the LNA is bypassed, which may be used when incoming signal strength is sufficiently large. As will be described herein, wireless devices can be controlled, statically or dynamically, to operate in one or more of these receive modes.

By such control, a receiver implementation may realize a good noise figure in a rural environment while the same receiver, differently configured, may realize good blocking in an urban environment. Note also it is possible in both transmit and receive modes for the off-chip filter to be bypassed. Still further, in some situations for a transmit mode an external power amplifier also may be bypassed when a transmit RF signal is received within the RF front end circuit with sufficient power for a given environment. For example, in certain countries, e.g., Japan, an ISM device may have regulatory requirements that limit its output power to 13 dBm (or 14 dBm in Europe). In such an implementation, the external power amplifier can be bypassed. Also in such cases, if a RF signal output from SoC 110 is greater than a certain power level (e.g., 10 dBm), the off-chip filter may be bypassed, to avoid damage that could occur from providing it a signal that exceeds its capability.

Referring now to FIG. 1, shown is a high level block diagram of a portion of a device such as an IoT device incorporating an embodiment. As illustrated in FIG. 1, IoT device 100 may be any type of IoT device that has wireless communication capabilities. In one or more embodiments, IoT device 100 may operate with a radio that uses the same frequency band for transmit and receive (half duplex), as opposed to cellular, which has different frequency for uplink and downlink. While embodiments may vary, the IoT device may be a metering device, an actuator device, a sensor device, wireless microcontroller (MCU), wireless camera, wireless speaker, wireless microphone, wireless lighting controller, lightbulb, or so forth.

In the high level shown in FIG. 1, a system on chip (SoC) 110 couples via an RF front end circuit 150 to an antenna 180, which may be used for both transmit and receive operations. Of course in other implementations, there may be separate antennas for receive and transmit. In the embodiment of FIG. 1, SoC 110 may be implemented in one integrated circuit (IC) and RF front end circuit 150 implemented in another IC. By providing multiple ICs, different IC processes can be used to fabricate the different ICs. For example, a first IC including RF front end circuit 150 may be optimized for RF performance, while a second IC including SoC 110 may be optimized for digital design. In other cases, both of these components may be implemented in a single IC. In typical cases, the circuitry of SoC 110 may be implemented on one semiconductor die and the circuitry of RF front end circuit 150 may be implemented on a different semiconductor die, whether implemented in separate ICs or in the same IC package. Further, while the specific implementation of FIG. 1 includes an SoC, in other cases, some other type of digital processor such as a baseband processor and/or application processor may be present.

Starting with SoC 110, a digital circuit 120 is present, which may perform the overall processing of the device. Although embodiments are not limited in this regard, the processing may include activities such as performing sensing, metering, controller functionality, actuator functionality or so forth. To enable wireless communication, digital information may be provided from digital circuit 120 to an analog circuit 130. In general, analog circuit 130 may include transceiver circuitry having transmit and receive paths including signal processing circuitry that perform various processing, including digital-to-analog conversion (in the transmit direction) and analog-to-digital conversion (in the receive direction), upconversion and downconversion, filtering, amplification and so forth.

Analog circuit 130 may transform the digital signals to analog form and further perform upconversion and other signal processing to generate RF signals. As seen in FIG. 1, analog circuit 130 may optionally include a power amplifier (PA) 132 that may amplify the incoming RF signals and output them to RF front end circuit 150.

In a receive direction, incoming receive signals that are received in SoC 110 couple to analog circuit 130. As further shown optionally a LNA 134 may be provided for gain control, before additional signal processing is performed. This signal processing may include, e.g., filtering, further gain control, and downconversion to result in digital signals that are provided to digital circuit 120.

RF front end circuit 150 also has transceiver circuitry including transmit and receive paths. With respect to the transmit path, incoming RF signals received from SoC 110 couple through switch circuitry 155. Understand that switch circuitry 155 is shown at a high level, logically as a single block. In practice, a number of different switches may be implemented within RF front end circuit 150 to perform the configurable switching and communication of receive and transmit signals according to different modes, as described further herein. That is, while switch circuitry 155 is shown as a single block, the multiple physical switch instantiations may be located throughout RF front end circuit 150. Also, by way of switch circuitry 155, both receive and transmit paths may leverage a single RF filter 170 coupled to RF front end circuit 150, thus reducing bill of materials (BOM) costs. In various embodiments, RF filter 170 may be implemented as a surface acoustic wave (SAW) filter. While for purposes of discussion, this RF filter is generally referred to herein as a SAW filter, understand that any type of RF filter, including various bandpass or low pass filters can be used.

With respect to the transmit path, RF signals to be transmitted may couple through switch circuitry 155 to SAW filter 170 (optionally), back through switch circuitry 155 and to a PA 160 for further amplification, before being output (through additional circuitry in switch circuitry 155) to antenna 180.

In a receive path, incoming RF signals received by antenna 180 couple into switch circuitry 155. Such receive RF signals, before or after gain control in a LNA 165, may be filtered by SAW filter 170, and pass further through switch circuitry 155 and thereafter be sent to SoC 110, and more specifically to analog circuit 130. Understand that while shown in the high level of FIG. 1 with a single LNA 165, in some cases there may be multiple LNAs that can be controllably coupled with SAW filter 170. For example, a received RF signal may pass through a first LNA, then through SAW filter 170, and then through a second LNA before being provided to SoC 110. And such multiple LNAs can be controlled to be bypassed, such that none, one, or both such LNAs may be part of a receive path.

In some cases, SoC 110 may provide an output signal at a power level of approximately zero dBm, which can be amplified both within PA 132 of analog circuit 130 of SoC 110 and PA 160 (or in cases, PA 160 may be bypassed). Note that in some cases, SAW filter 170 may be designed to only withstand approximately 10 dBm of power, such that in the transmit direction the transmit RF signal may be filtered in SAW filter 170 prior to further amplification.

As further shown in FIG. 1, SoC 110 may include a microcontroller unit (MCU) 135. Among its duties, MCU 135 sends mode control signals to RF front end circuit 150. As seen, these signals may be provided to a controller 158 (which may be implemented as a microcontroller, finite state machine or so forth). In response to such control signals, controller 158 may dynamically configure and reconfigure switch circuitry 155 to operate in a given one of a transmit or receive mode (as RF front end circuit 150 can only operate in a transmit or receive direction at any given time). Still further, in various implementations there may be multiple receive modes and potentially multiple transmit modes available and which may entail different configurations of switch circuitry 155. Understand while shown at this high level in the embodiment of FIG. 1, many variations and alternatives are possible.

Figure 2:
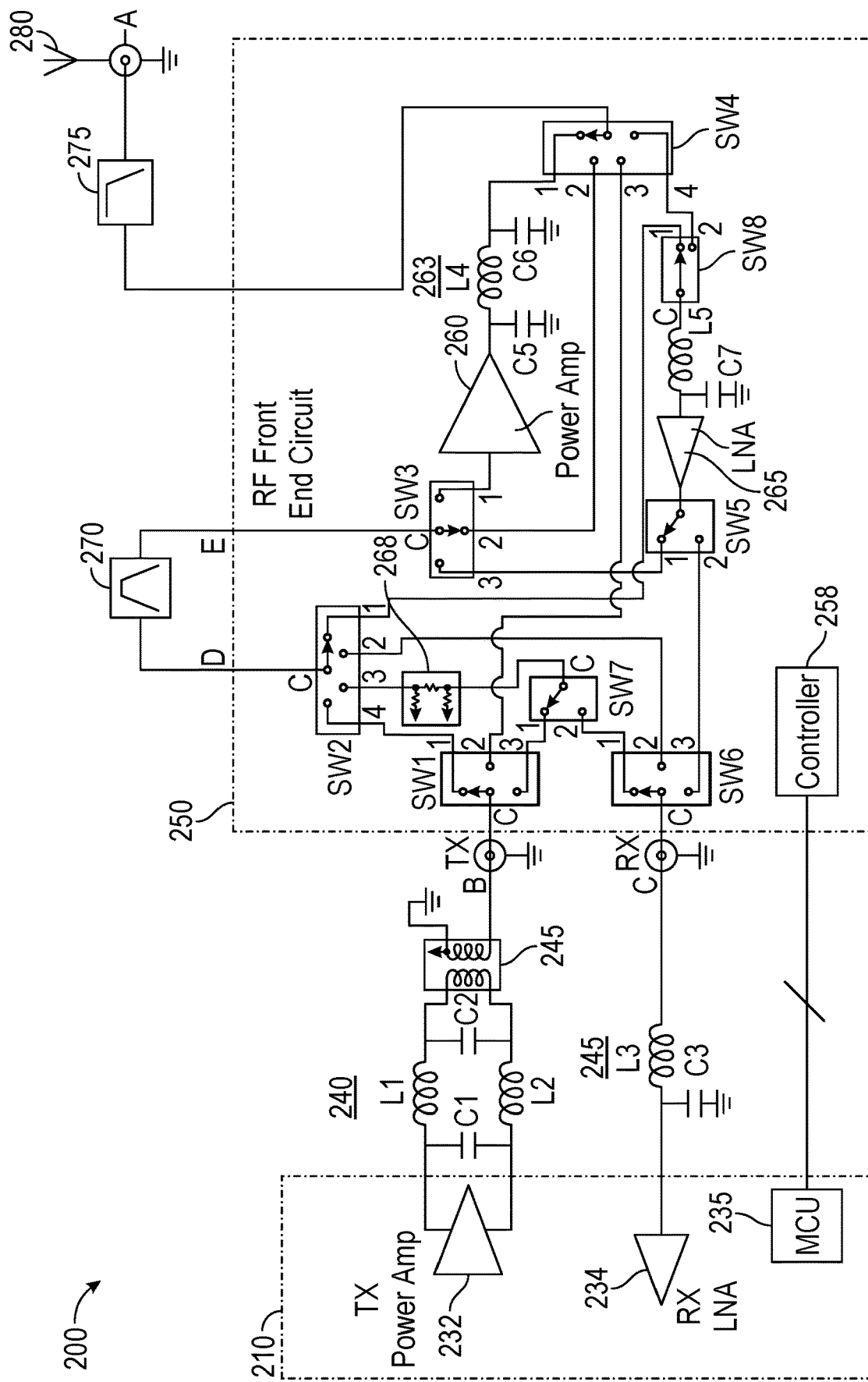
FIG. 2 is a schematic diagram illustrating further details of a switch arrangement in accordance with an embodiment.

Referring now to FIG. 2, shown is a schematic diagram illustrating further details of a switch arrangement in accordance with an embodiment. As shown in FIG. 2, a device 200 shows a more detailed view of a switch circuit implementation. In general, device 200 may be a similar IoT device as device 100 of FIG. 1, and thus to the extent that the same numbering conventions are used in FIG. 2 (although of the "200" series rather than the "100" series of FIG. 1), like components are shown and in some cases are not further discussed below.

At a high level, device 200 includes an SoC 210, an RF front end circuit 250, a SAW filter 270, and an antenna 280.

SoC 210 is shown in the illustration of FIG. 2 as having a transmit power amplifier 232 and a receive LNA 234.

In the transmit direction, PA 232 outputs a differential RF signal that couples through a differential impedance match circuit 240 (formed of inductors L1, L2 and capacitors C1, C2). The matched differential RF signal is converted to single-ended form via a balun 245. Of course, other topologies are possible for RF matching and transition from differential to single-ended signals. The resulting single-ended transmit RF signal couples to RF front end circuit 250 via a transmit port B, which also may be used as a test port.

In the transmit direction, RF front end circuit 250 includes a transmit signal path including various switches and other circuitry to process and direct the transmit RF signal to its destination, namely, antenna 280. More specifically, with reference to FIG. 2, the transmit RF signal may couple through switches SW1 and SW2 (either with attenuation via an attenuator 268 using additional switch SW7, or unattenuated) to be directed to SAW filter 270 (via off-chip ports D and E, respectively). In an embodiment SAW filter 270 may be a bandpass filter configured to pass a band appropriate for a given device (e.g., between 875 and 950 MHz). After being filtered in SAW filter 270, the filtered transmit RF signal couples through switch SW3 and to power amplifier (PA) 260, before being output through matching circuitry 263 (including inductor L4 and capacitors C5, C6). From there, the amplified transmit RF signal couples through switch SW4 and is output from RF front end circuit 250 and through a low pass filter (LPF) 275 to antenna 280 coupled to a port A. In an embodiment, LPF 275 may be a third order low pass harmonic filter having a typical loss level of approximately 0.5 dB. Note that the position of LPF 275 and SAW filter 270 may not be swapped, as in some use cases, the RF signal level that passes through LPF 275 would cause damage to SAW filter 270. In an embodiment, LPF 275 is designed to have much less insertion loss and much higher power rating than SAW filter 270, but may also have much less selectivity and a wider transition.

Still with reference to FIG. 2, in a receive direction, incoming RF signals pass through antenna 280 and LPF 275 and into RF front end circuit 250. In the receive direction, the incoming receive RF signal couples through switch SW4 and, depending upon mode, either directly to LNA 265 (via switch SW8) or via switch SW3 to SAW filter 270 (and thereafter through switches SW2 and SW8) and then to LNA 265. This determination may be based on whether filtering is desired before or after amplification in LNA 265.

As seen, it is further possible for the amplified receive RF signal output by LNA 265 to pass through switches SW5 and SW3 to SAW filter 270. In yet other cases, SAW filter 270 may be bypassed in the receive direction, such that the amplified receive RF signal is provided directly from switches SW4 and SW8 through LNA 265 and through switches SW5 and SW6, and thereafter off-chip through an impedance matching circuit 245 formed of inductor L3 and capacitor C3 to SoC 210, and more specifically, to LNA 234.

Still further it is possible in the receive direction for attenuation to occur via attenuator 268 that couples between switch SW2 and switch SW7 and in turn, provides the attenuated receive RF signal to SoC 210 through switch SW6. While switches SW1-SW8 are illustrated in FIG. 2 as various single pole multiple throw (P/T switches), other types of switches may be used.

Of course while shown with this particular implementation with the above-described paths through RF front end circuit 250, switching circuitry may take various forms to enable transmit and receive paths to share a single SAW filter, reducing costs and complexity. However embodiments are not limited in this regard, and it is possible for there to be multiple filters present. And in this case, it is also possible to switch into the receive path multiple different filters for different bands of operation. Furthermore, it is possible by way of different control of the various switches to enable both transmit and receive RF signals to pass through the respective transmit and receive paths in different orders.

Still referring to FIG. 2, controller 258 may dynamically configure the various switches to enable operation in a desired transmit or receive mode, as well as sub-modes that may be available in a given implementation. To this end, controller 258 receives incoming front end control signals from SoC 210 (more specifically from MCU 235).

In response to these control signals, controller 258 may control the various switches as described above. In a particular embodiment, MCU 235 may output four front end mode control signals. Controller 258, based at least in part on these control signals, may dynamically configure the switches of RF front end circuit 250 accordingly. With four control lines being provided to controller 258, there may be sufficient programmability for 16 different modes, with approximately half of these modes available for transmit operations and half available for receive operations. Or certain states can be reserved for other modes such as testing or measurement modes.

Figure 3:
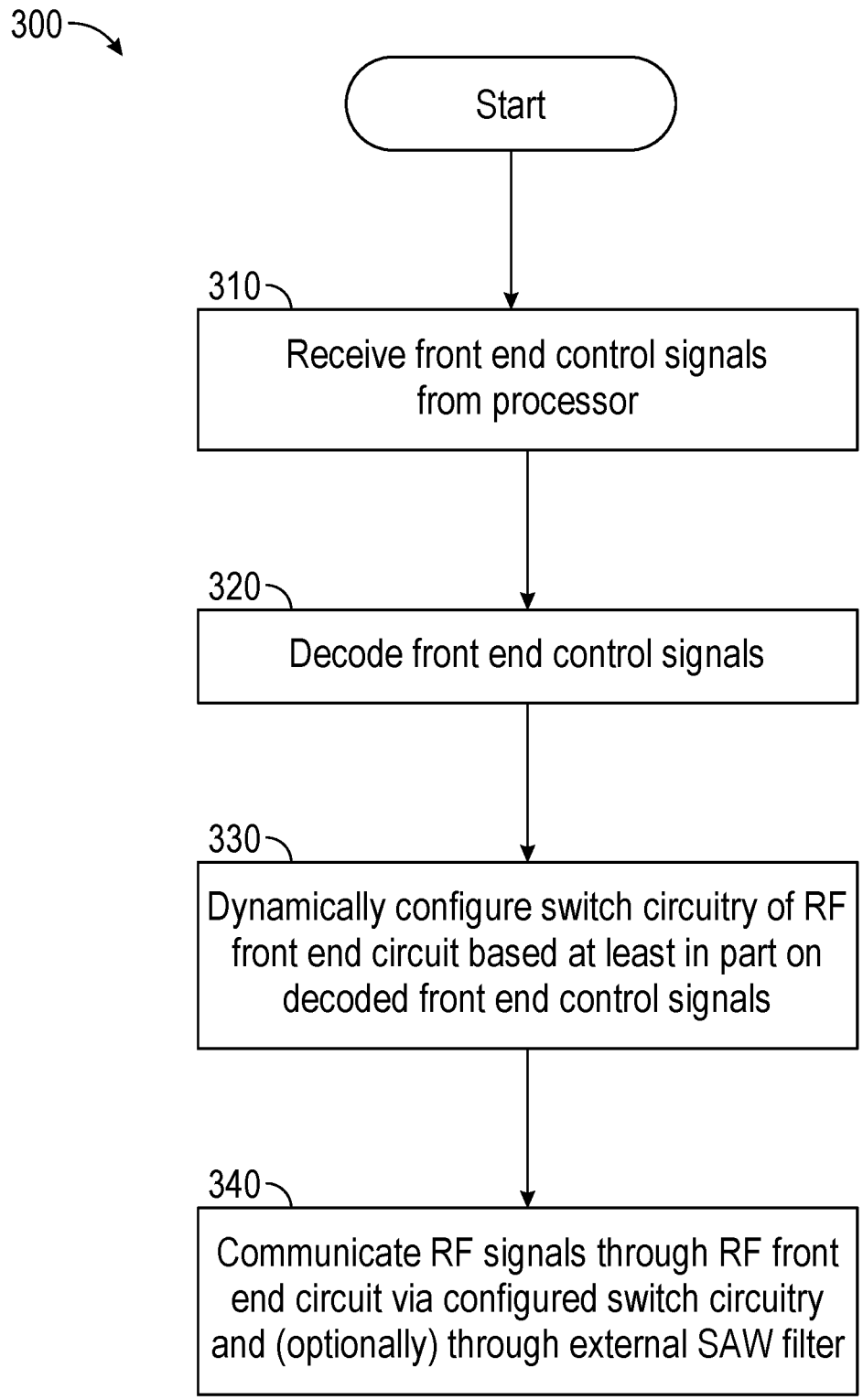
FIG. 3 is a flow diagram of a method in accordance with an embodiment.

Referring now to FIG. 3, shown is a flow diagram of a method in accordance with an embodiment. As shown in FIG. 3, method 300 is a method for controlling switch circuitry of an RF front end circuit such as may be performed by a controller or other hardware circuit within the RF front end circuit. In some cases, the controller may execute instructions stored in a non-volatile memory. In an embodiment, this non-volatile memory may be implemented as a non-transitory storage medium that can store instructions and data. Such non-volatile memory may store instructions, including instructions for receiving mode control signals and controlling switch circuitry in response to the mode control signals, as described herein.

As illustrated, method 300 begins by receiving front end control signals from a processor (block 310). As discussed above, there may be a plurality of control lines that provide control signals to indicate a desired mode and sub-mode, namely transmit or receive mode, and potential sub-modes including any bypass modes, urban/rural modes or so forth. Next at block 320, the front end control signals may be decoded, e.g., in the controller of the RF front end circuit.

Still with reference to FIG. 3, control passes to block 330 where switch circuitry of the RF front end circuit may be dynamically configured based at least in part on these decoded signals. In an embodiment as in FIG. 2, the single pole multiple throw switches may be controlled to provide a selected connection between a common port and a given one of the available throw ports. At this point the RF front end circuit is appropriately configured for operation in a given mode. As such, at block 340 RF signals may be communicated through the RF front end circuit via this configured switch circuitry. In this way, transmit or receive RF signals may pass through at least some of the switch circuitry according to a desired path such that the RF signals may optionally pass through a single external SAW filter, which may be used for both transmit and receive modes. Understand while shown at this high level in the embodiment of FIG. 3, many variations and alternatives are possible.

In various embodiments, receiver system performance may be optimized for radios (especially OFDM radios) used in wireless networks, for different RF spectrum environments. By controlling the switching circuitry described herein, a wireless device may operate in a given one of multiple modes. Although embodiments describe three modes, referred to as rural, urban, and bypass modes, understand that additional or different modes may be available using the techniques described herein.

The determination of which mode to operate in may be based at least in part on RF signal level detection information received from one or more RF level detectors present in a receiver RF signal processing path. A controller may determine when a mode switch is to be performed based at least in part on such information. In other cases, another entity may determine an appropriate mode without reference to this detected information. For example, an installer or central entity could set the mode, e.g., based on knowledge of location. Or a selected mode may be configurable based on SoC derived information such as SoC signal quality or RSSI or packet error rate information.

Thus in embodiments, a front end module (FEM) may have a plurality of receiver operating modes to provide optimal reception under various interfering conditions. The most protected mode, the bypass mode, in terms of interference handling, has also the largest noise figure which impacts (degrades) the receive sensitivity. In general, going to a more protected operating mode comes at the price of a reduced receive sensitivity. In one or more embodiments, if there is no severe interference the least protected operating mode (the rural mode) may be used, as this results in the highest receive sensitivity.

When the signal level of a receive RF signal exceeds a given threshold, the signal could potentially harm LNA performance by overloading its input. When such an overload condition is detected, the controller may reconfigure the FEM to a more protected mode (e.g., one of urban or bypass modes) to protect the LNA. In different circumstances the FEM may transition from rural to urban mode, or from urban to bypass mode, or from rural to bypass mode. For example, when transitioning from rural to urban mode, it may be that the signal level of the receive RF signal is no longer crossing a given detection threshold, in which case the LNA can operate without severe overload issues. When transitioning to bypass mode the LNA is bypassed in which case the LNA overload issues are avoided all together. After transitioning to a more protected mode, some degradation in noise figure can be incurred, and thus it may not be desirable to stay in the more protected mode indefinitely.

In rural environments, longer distance between radios is needed to reduce network costs. Better sensitivity enables longer distance coverage. Having no signal loss (filters have signal loss) between the antenna and the LNA provides best sensitivity, but performance with strong out of band blocking signals would suffer because they would not be filtered before reaching the LNA. Fortunately, rural locations often have fewer blockers than urban locations. Thus in an embodiment, in a rural mode, the optimal relative ordering within a receiver RF signal processing path may be antenna, LNA, filter, and thereafter to a receiver back end. In one or more embodiments, a broad bandwidth RF level detector may be coupled to an input of the LNA. This RF detector may measure the signal coming in from the antenna when in the rural mode.

In certain implementations, firmware or other controller mechanism may be used to cause a wireless device having a front end module in accordance with an embodiment to enter into a rural mode as a starting mode. If the RF level detector determines that the signal level is low enough (e.g., less than a first threshold) that the LNA will not experience any significant distortion, then reception may continue safely in this mode. Note that a calibration can be done to set this transition threshold accurately.

Strong undesired signals, like those that are out of band, can distort desired signals. The impact that distortion has on OFDM desired signals can be much worse than FSK desired signals. If the undesired signal is also an OFDM signal such as used in cellular LTE, the distortion can be even worse. If the RF level detector determines that the signal level is high enough that the LNA may experience distortion and corrupt the desired RF signal, then the controller may cause a quick change to the urban mode.

In urban environments, radios are typically densely populated, and thus long distance capabilities are not needed as much. Strong out of band blocking signals may be prevalent, and blockers are usually the limiting factor in system performance. Having a filter between the antenna and LNA hurts sensitivity, but greatly attenuates the out of band blockers.

Thus in an embodiment, in an urban mode the optimal relative ordering within a receiver RF signal processing path may be antenna, filter, LNA and thereafter to the receiver back end. The RF level detector may be positioned on the LNA input and the filter output. With this configuration, the signal level of out of band blockers can be greatly reduced. If the RF level detector determines that the signal level is low enough that the LNA will not experience distortion, then reception continues safely in this mode. If a strong blocking signal is within the pass band of the filter, it would not reduce it. It is possible that the RF level detector may determine that the signal level is high enough that the LNA may experience distortion and corrupt the desired RF signal. In this case, the controller may cause a quick change to the bypass mode.

Bypass mode may be used in environments in which radios are so densely populated that the LNA is not needed and can even cause distortion, even when the filter is in front of it. In such cases, in the bypass mode the optimal relative ordering within a receiver RF signal processing path may be antenna and filter (bypassing the LNA) and thereafter to the receiver back end. In this mode, an RF level detector placed between the antenna and the filter may be used to determine if the strong blocking signals have gone away.

The RF level detection and mode changing can occur quickly enough that it is possible to simply begin each receive operation in rural mode, and switch to the next more protected mode only when needed.

Using a front end module having configurable switching circuitry as described herein, various applications may install a common architecture of a radio in any location and the radio can actively accommodate the environment, even if the environment changes. Such environment change may be, as an example, where a location is initially less densely populated and as time goes on, additional development occurs, bringing with it a much larger amount of radios within the environment.

In other cases, certain applications may already know the environment in which it is being deployed. In these cases, the application can lock a radio into only a single desired mode for the deployed environment, e.g., by firmware setting. The hardware still allows deployment in any of the three environments and avoids the need for three different types of hardware to be developed, produced, and stocked. In contrast, existing techniques require changes to radio architecture design and are tailored to only one specific environment. Existing techniques do not allow for firmware setting of desired mode when the environment is known and established ahead of time, nor do existing techniques allow for dynamic adapting to various RF spectrum environments as environments change.

Figure 4A:
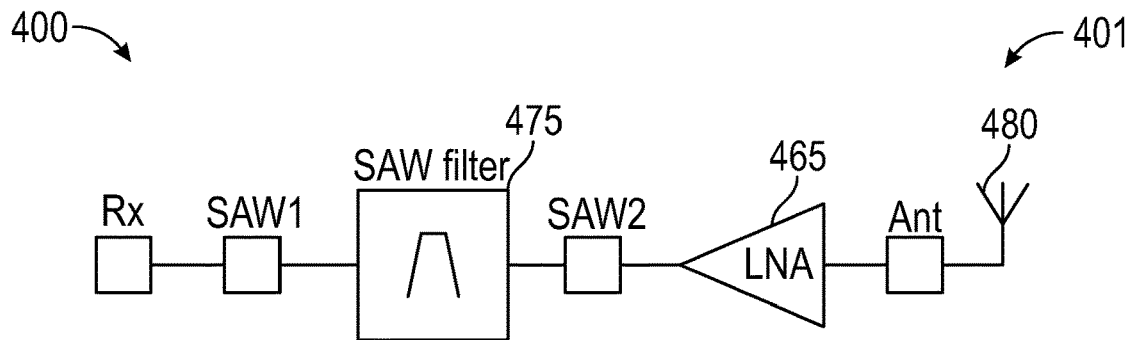
FIGS. 4A-4C are schematic diagrams illustrating various configurable modes in which a wireless device in accordance with an embodiment may be used.
Figure 4B:
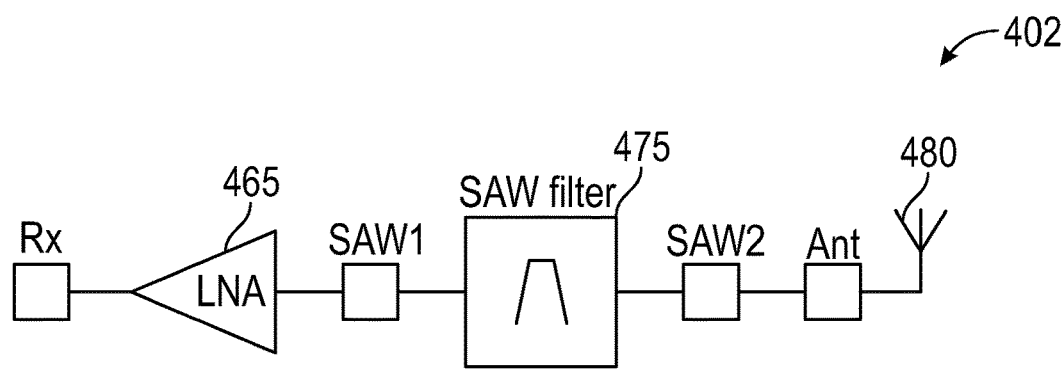
Figure 4C:
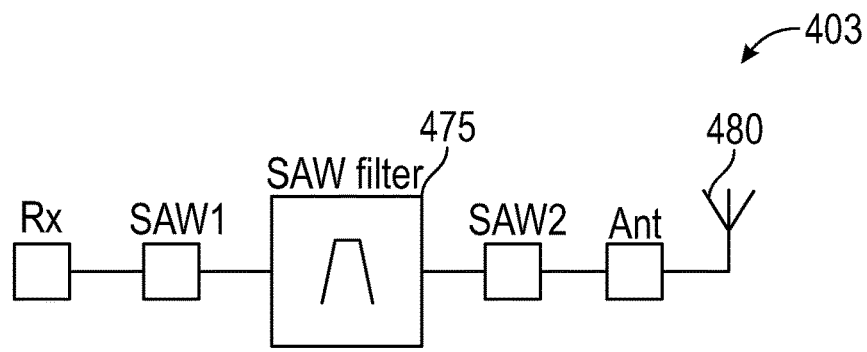

Referring now to FIGS. 4A-4C, shown are schematic diagrams illustrating various configurable modes in which a wireless device in accordance with an embodiment may be used.

Starting first with FIG. 4A, shown is a schematic diagram of a wireless device 400 in a first operating mode, namely a rural mode 401. In the high level illustrated in FIG. 4A, a receive RF signal processing path proceeds from an antenna 480, through an antenna pin (Ant) to an LNA 465 and thereafter to a SAW filter 475 (which may be an off-chip SAW filter) via additional pins SAW2 and SAW1. Thereafter, the amplified and filtered RF signal is output to a companion device (e.g., an SoC not shown for ease of illustration in FIG. 4A) via another pin (Rx). Of course additional signal processing within a front end module may occur.

Note that the various components discussed above in FIG. 4A may correspond to those discussed above with relation to FIG. 2 (identified with the same reference numerals, albeit of the "400" series), and as such they are not further discussed. While not shown for ease of illustration in FIG. 4A, understand that switching circuitry of a front end module, as controlled by control signals received from the SoC, may cause the configuration of wireless device 400 into rural mode 401.

Referring now to FIG. 4B, shown is a schematic diagram of wireless device 400 in a second operating mode, namely an urban mode 402. In the high level illustrated in FIG. 4B, the relative locations of SAW filter 475 and LNA 465 are swapped. Understand that no physical hardware differences exist since the same hardware remains in the same locations: rather by way of the switching circuitry, the receive RF signal processing path shown in FIG. 4B is realized.

Now with reference to FIG. 4C, shown is a schematic diagram of wireless device 400 in a third operating mode, namely a bypass mode 403. In the high level illustrated in FIG. 4C, the receive RF signal processing path proceeds from antenna 480 and to SAW filter 475, and then the filtered RF signal is output to the companion device, without passing through an LNA.

Understand while FIGS. 4A-4C show particular modes possible with a wireless device in accordance with an embodiment, other arrangements are possible. Furthermore, while a single SAW filter and a single LNA are shown, in other instances a wireless device and its included front end module may include multiple LNAs and SAW filters, with appropriate selection of an active component by way of switching circuitry such as described herein.

Still further, in some implementations, there may be additional circuitry that couples between a SAW filter and an antenna. For example, a transmission line (having a non-zero length) or an inductor may be coupled off chip on a path between the antenna and SAW filter. These components where present may be used to provide an impedance matching function and potentially provide additional filtering. In general the SAW filter can be regarded as a filter that is passing the frequency band of interest with relatively low attenuation and is attenuating frequencies outside the band of interests. One skilled in the art will understand that the SAW filter can be replaced by other types of filter, such as a filter built by any combination of transmission lines, inductors, and capacitors. In addition, the SAW filter could be a combined with additional filtering, like additional SAW filters or a filter built from capacitors and inductors. In different implementations, a variety of filter types could be implemented like bandpass filters, notch filters, low-pass filters or high-pass filters.

Furthermore, understand while FIGS. 4A-4C illustrate three different operating modes, it is possible for a given wireless device, as programmed for a particular end user in a field location, may be configured, either statically or dynamically, to enable only one or two of the operating modes. Thus depending upon the actual use case, only one or two of the three above-described operating modes may be available, although the underlying hardware to effect the relative component arrangements of FIGS. 4A-4C is present.

For example, a designer or provisioner of a wireless device incorporating an embodiment may determine when provisioning a wireless network that environment to enable/disable certain modes statically. In this way, embodiments provide the ability to configure wireless devices into a network to enable/disable certain modes and/or to control which modes/combinations are allowed to occur in what order.

As one such example assume during provisioning that conditions indicate a network environment existing in a high blocker area. In this situation, wireless devices may be configured into the network statically to enable/disable certain modes and/or allowed state transitions. In this example, wireless devices placed in this high blocker area can be configured to start operation in urban mode (and/or to disable rural mode).

Depending upon particular system implementation, selection of an active operating mode (in a dynamic instance) may be controlled by an SoC. In different implementations, the SoC may make such decisions based on receipt and analysis of metric information regarding incoming RF signals (e.g., in the form of received signal strength information (RSSI), signal-to-noise ratio (SNR), blocker information, or other signal quality metric information). In still other cases, a front end module may include one or more detector circuits such as RF detectors to measure RF signal levels at various points within a receiver RF signal processing path and provide such level information for use by a controller of the SoC.

Figure 5A:
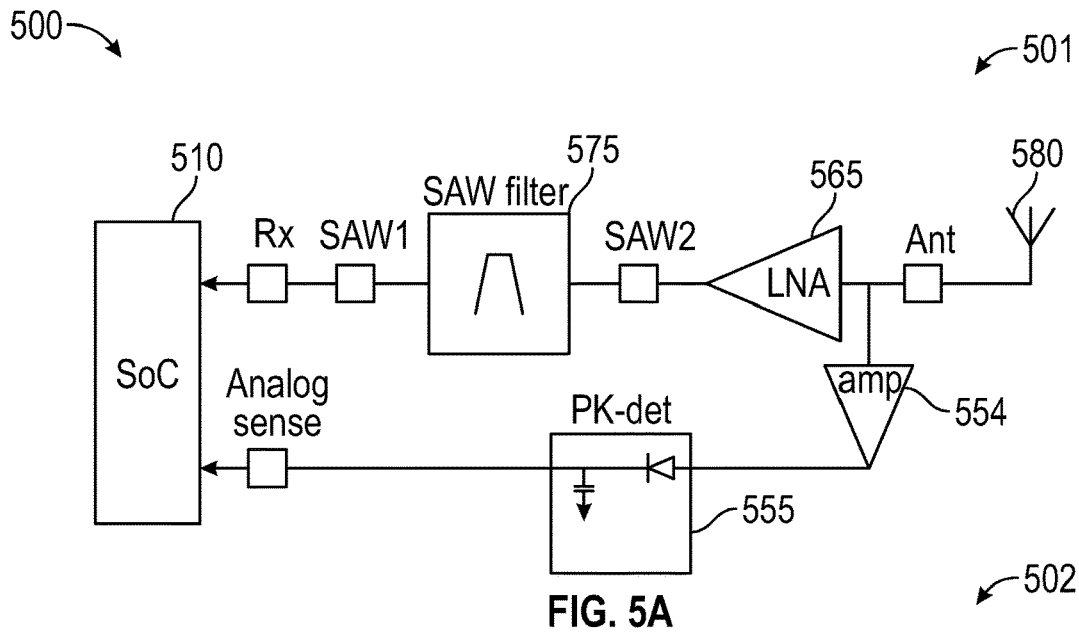
FIGS. 5A-5C are schematic diagrams illustrating various configurable modes in which a wireless device in accordance with an embodiment may be placed.
Figure 5B:
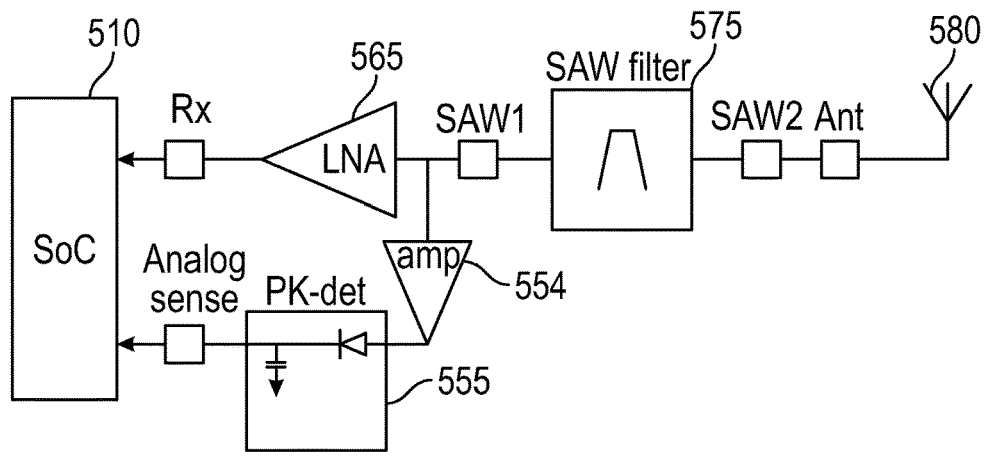
Figure 5C:
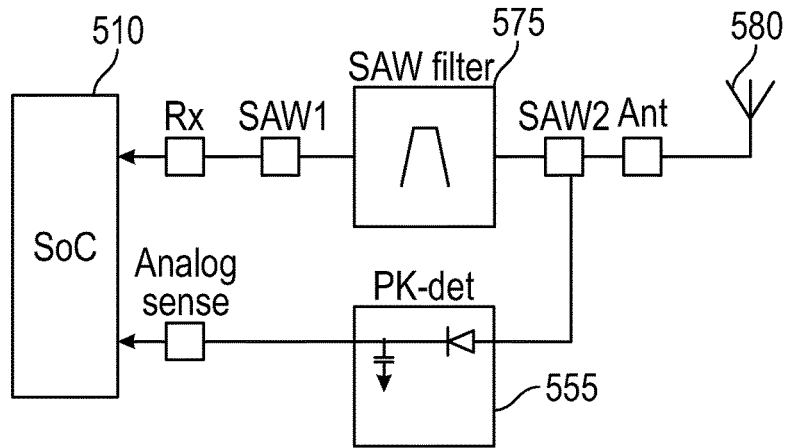

Referring now to FIGS. 5A-5C, shown are schematic diagrams illustrating various configurable modes in which a wireless device in accordance with an embodiment may be placed, based at least in part on power level information obtained from power detector circuitry.

As illustrated in FIG. 5A, a wireless device 500 may be arranged in a rural mode 501 as in FIG. 4A (and thus the same reference numerals, albeit of the "500" series, are used). As shown wireless device 500 includes, in addition to RF front end circuitry, an SoC 510. In addition, a sense amplifier 554 and a detector circuit 555 are illustrated. In one or more embodiments, detector circuit 555 may be implemented as an RF peak detector.

As seen in the rural mode implementation of FIG. 5A, sense amplifier 554 and detector circuit 555 couple to an input of LNA 565 such that an RF level detected within detector circuit 555 provides a signal level of the received RF signal from antenna 580. In the illustration of FIG. 5A, note that this signal level information output by detector circuit 555 is provided to SoC 510 via another pin (Analog sense).

As illustrated in FIG. 5B, wireless device 500 may be arranged in an urban mode 502 as in FIG. 4B (and thus the same reference numerals, albeit of the "500" series, are used). The same relative location of detector circuit 555 with respect to LNA 565 occurs in urban mode 502 as in rural mode 501; however, the RF signal input to detector circuit 555 (via sense amplifier 554) has been filtered in filter 575. Note that it is possible for there to be additional detector circuits such as a second RF peak detector (including amplifier and peak detector) used to monitor the signal level at pad SAW2. This detected information could be used to determine when to transition back from urban to rural mode. For example, when there is a strong out of band blocker present, the second peak detector measures a much higher value than the first peak detector. When the value measured by the second peak detector drops below a second threshold (e.g., the out of band blocker finished its transmission), a determination may be made to cause a mode switch back to the rural mode.

As illustrated in FIG. 5C, wireless device 500 may be arranged in a bypass mode 503 as in FIG. 4C (and thus the same reference numerals, albeit of the "500" series, are used). In bypass mode 503, detector circuit 555 may couple at an input to SAW filter 575, as in this mode there is no active LNA. Also note that in this configuration there is no need for presence of a sense amplifier. Note that an additional peak detector coupled to the SAW1 pad may be useful to determine whether it may be appropriate to transition back from the bypass mode to the urban mode. Yet understand that as discussed above with regard to FIGS. 4A-4C, there are no hardware differences, only different control of switching circuitry to enable the various modes illustrated in FIGS. 5A-5C. Also note that it is possible, e.g., based on firmware and/or hardware control, to enable an associated SoC to enter into a given low power mode while the RF detector infrastructure is active.

Figure 6A:
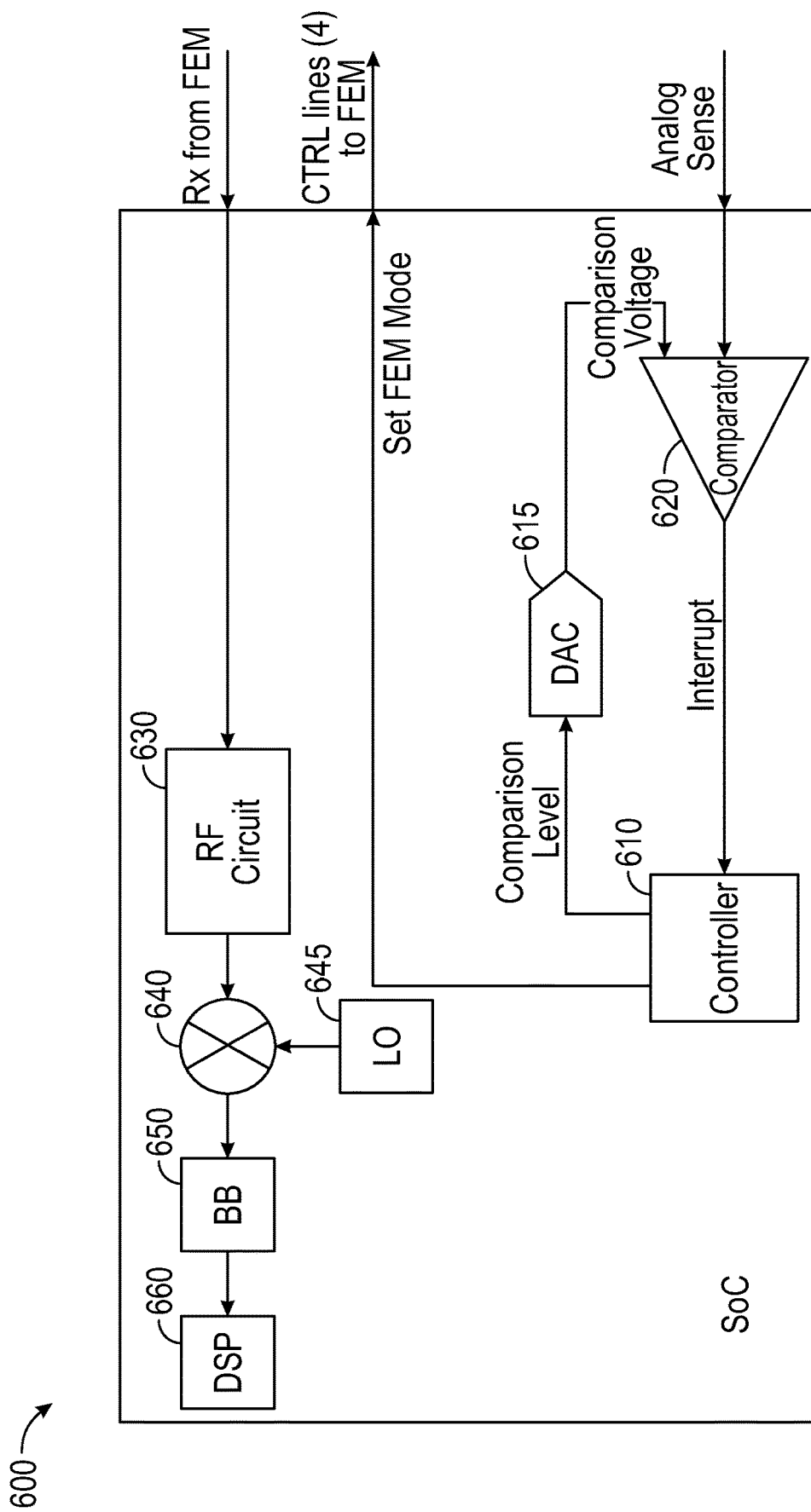
FIGS. 6A-6B are block diagrams of a system on chip in accordance with an embodiment.

Referring now to FIG. 6A, shown is a block diagram of a system on chip in accordance with an embodiment. As shown in FIG. 6A, SoC 600 includes a controller 610, which may be a radio processor, e.g., implemented as a sequencer (which in one embodiment may be implemented as an embedded ARM M0 central processing unit (CPU)) that is configured to control, in a static or dynamic manner, a front end circuit having switching circuitry as described herein. In one or more embodiments, controller 610 may execute instructions stored in a non-transitory storage medium. Such instructions that are used to perform the control of switching circuitry may be implemented as firmware and/or software. For example, a given wireless device manufacturer may provide firmware that is to statically affix the switching circuitry to provide for a static mode of operation, e.g., a given one of the rural, urban and/or bypass modes described herein. In other cases, the firmware is used to provide dynamic control. In this case, based on environmental conditions, a given one of these modes may be selected, where the selection may dynamically change during operation based on environmental conditions (as determined, e.g., based on detected RF levels).

With reference to FIG. 6A, controller 610 provides control signals to control a front end module as described herein. Such control may be based, in a dynamic implementation, in response to detected RF levels received via one or more analog sense inputs.

In an embodiment, the RF level detector is multiplexed from the FEM to SoC 600, where it can be measured and compared to a predetermined threshold. If under the threshold, no change is made. If the signal level is above the threshold, SoC 600 quickly changes the receiver operating mode of the FEM to urban mode. In an embodiment, this change may be implemented within an Automatic Gain Control (AGC) algorithm. When switching, the relative order of the receiver RF signal processing path is changed, but the desired signal amplitude may change very little. Out of band blocking signal levels at the input to the LNA would reduce by the amount of the filter selectivity.

As shown, feedback information from the front end module is provided to an analog comparator 620 which further receives a comparison voltage generated by a digital-to-analog converter (DAC) 615. Controller 610 may provide a comparison level signal to DAC 615 to cause it to generate the comparison voltage at a given level. More specifically, DAC 615 may generate a reference voltage signal, namely a given one of multiple threshold levels depending upon mode of operation, under control of controller 610.

In various embodiments, comparator 620 performs comparisons continuously without any processor required, improving response time. If a detected RF signal level exceeds a given threshold, comparator 620 sends an interrupt to controller 610. Once controller 610 is notified of this interrupt, it chooses the next mode (in some cases based on the application, some modes may not be allowed). Then controller 610 sends a message to indicate the mode change to the front end module. In an embodiment, this message may be a communication of control signals such as a 4-bit signal on the FEM CTRL0-3 lines.

Still referring to FIG. 6A, incoming RF signals from the front end module are received via an Rx pin and are provided to an RF circuit 630, which may include an optional LNA and other signal processing circuitry, such as filters, other gain control and so forth. Thereafter, the receive RF signal is downconverted in a mixer 640 that receives a mixing signal from a local oscillator (LO) 645. The downconverted signals output from mixer 640 may be provided to a baseband processor 650 for baseband processing, and thereafter may be provided to a digital signal processor (DSP) 660 (that in turn may couple to a main CPU of SoC 600, not shown in FIG. 6A). Understand while shown at this high level in the embodiment of FIG. 6A, many variations and alternatives are possible.

Figure 6B:
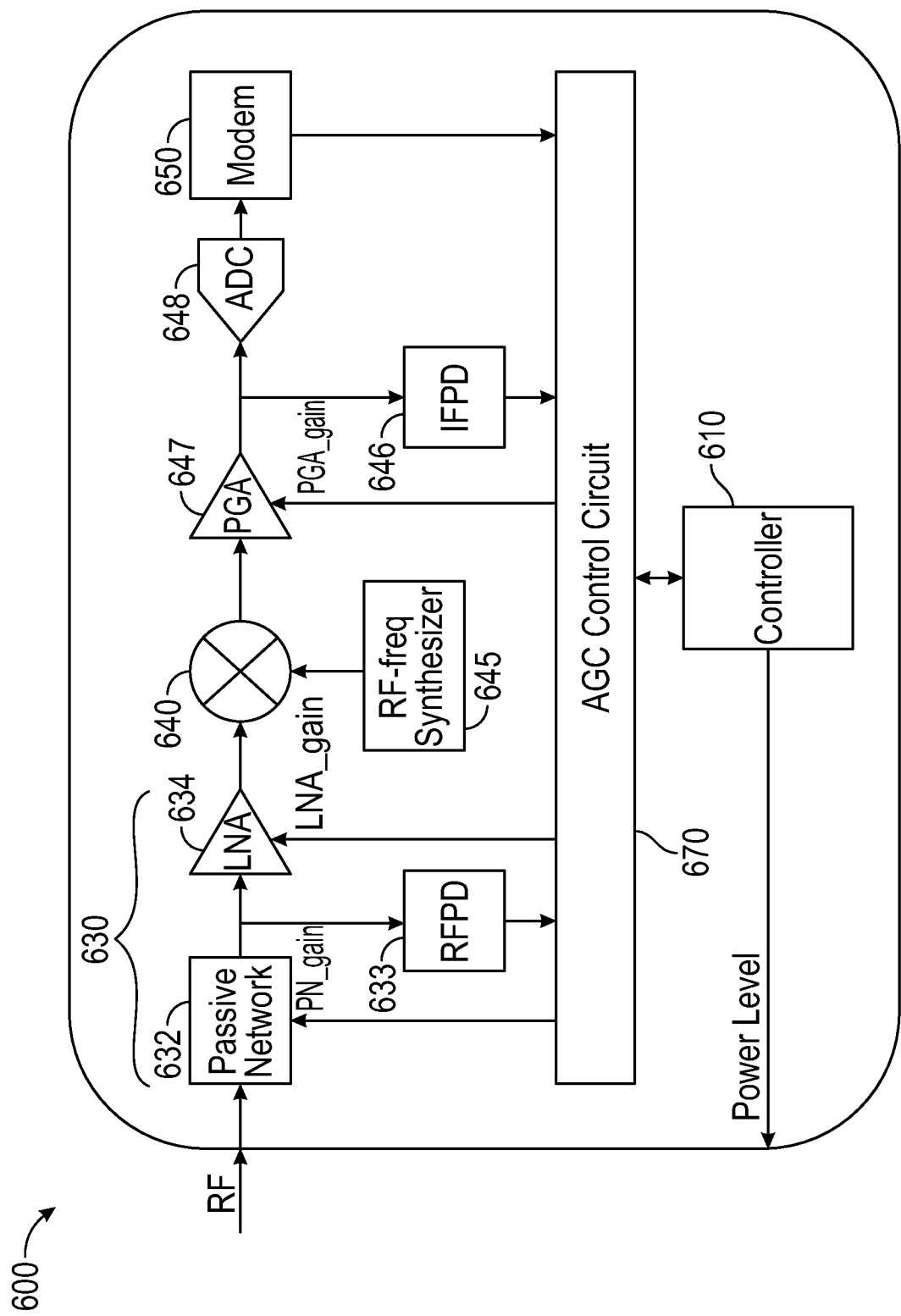

For example, in FIG. 6A, SoC 600 is shown at a relatively high level of detail, and various components are not fully illustrated. Referring now to FIG. 6B, shown is a more detailed block diagram of an SoC in accordance with an embodiment. As shown in FIG. 6B, SoC 600 may generally be arranged the same as SoC 600 of FIG. 6A. However, further details of the components included are illustrated.

In this arrangement, further details of a receiver RF signal processing path are shown. Thus as illustrated, an RF circuit 630 is shown in further detail, including a passive network 632 which may include one or more passive attenuators or so forth and an LNA 634. As further illustrated, a downconverted signal output from mixer 640 may be additionally gain controlled in a programmable gain amplifier (PGA) 647, the output of which is coupled to an analog-to-digital converter (ADC) 648, which digitizes the signal information and provides it to a modem 650 (which may be part of DSP 650 shown in FIG. 6A).

As further shown in FIG. 6B, various detectors, namely an RF peak detector 633 and an intermediate frequency (IF) peak detector 646, may couple to the RF signal processing path to measure signal levels and provide the information to an AGC control circuit 670. Based at least in part on this information, AGC control circuit 670 may control the various gain network components within SoC 600. Furthermore, in response to an indication of a loading level of passive network 632, based at least in part on the detected power level by RF peak detector 633, controller 610 may be triggered, e.g., responsive to an interrupt, to move into a bypass mode to eliminate such overloading, as described herein.

Figure 7:
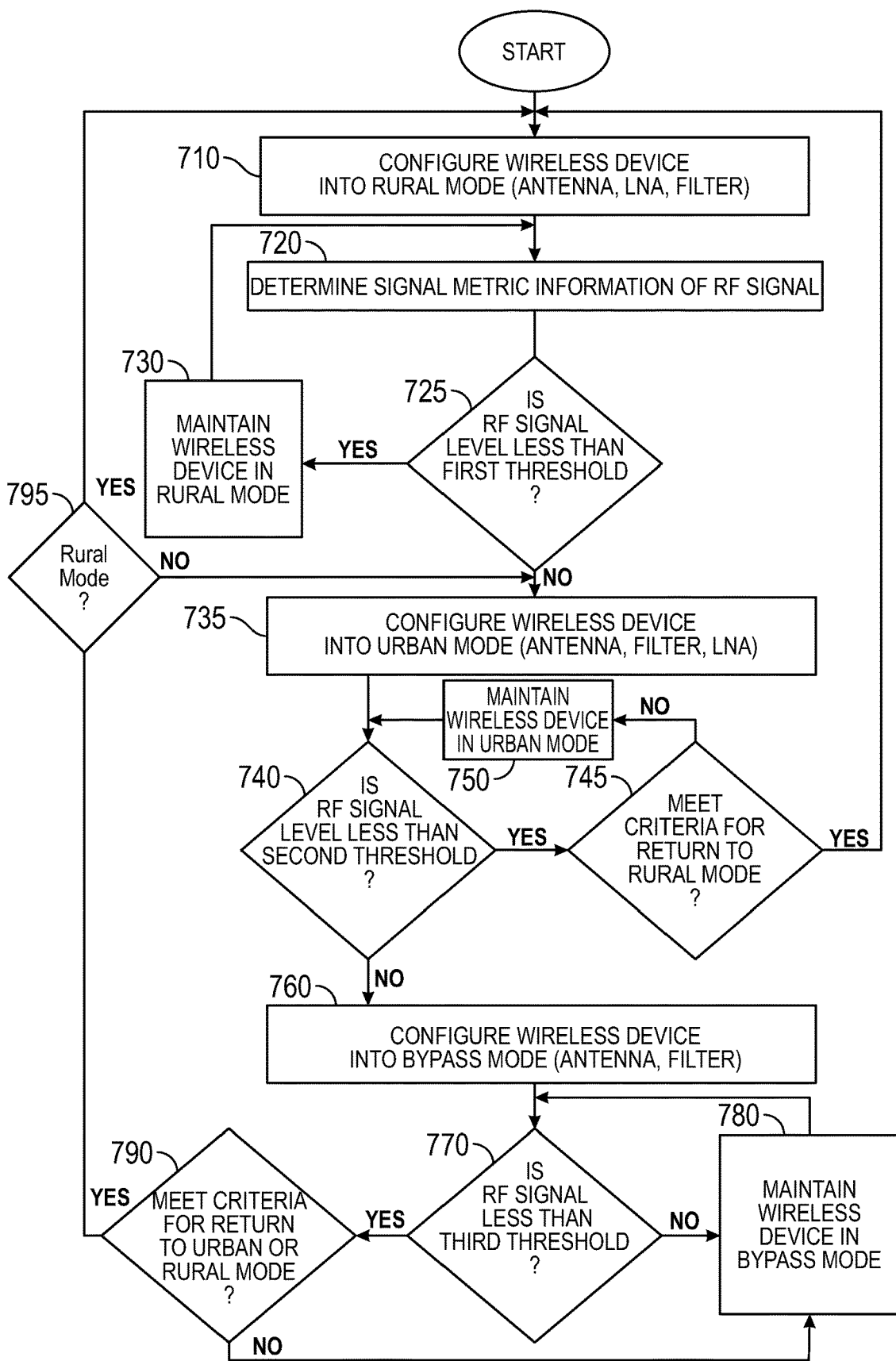
FIG. 7 is a flow diagram of a method in accordance with an embodiment.

Referring now to FIG. 7, shown is a flow diagram of a method in accordance with an embodiment. Specifically as shown in FIG. 7, method 700 is a method for dynamically controlling a wireless device to operate in a selected one of multiple modes. As such, method 700 may be performed by a controller, which may be present in an SoC of the wireless device that couples to a front end module of the wireless device. In other cases, the controller may be included in the front end module itself. It is further possible to include all of the processing circuitry, controller and front end module circuitry in a single integrated circuit.

In any event, method 700 begins by configuring the wireless device into a rural mode (block 710). In this mode, a receiver signal processing path is effected by way of switching circuitry to pass an RF signal received via an antenna to an LNA and thereafter to a filter (e.g., a SAW filter) that may be implemented off-chip from the front end module.

At this point, the wireless device may enter into normal operation where it receives and processes RF signals and further may transmit RF signals. During operation, at block 720 the RF signal level at the LNA input may be measured, e.g., via an RF level detector. This information may be provided to the controller via an analog sense pin. Then at diamond 725, it may be determined whether the RF signal level is less than a first threshold. In embodiments, this first threshold may be set at a relatively low level such that this comparison indicates whether the received RF signal benefits from a highest sensitivity condition. If it is determined that the RF signal level is less than the first threshold, control passes to block 730 where operation in the rural mode may be maintained. As such, control passes back to block 720.

Still with reference to FIG. 7, instead if it is determined that the RF signal level exceeds this first threshold, control passes to block 735 where the wireless device may be configured into an urban mode. In this urban mode, an RF signal received via the antenna may be provided to the filter and thereafter to the LNA. Control next passes to diamond 740 to determine during this urban mode operation whether the RF signal level is less than a second threshold. Note that this second threshold may be set at a higher level than the first threshold.

If it is determined that the RF signal level is less than this second threshold, control passes to diamond 745 to determine whether conditions are such that one or more criteria for a return to a rural mode have been met. Although embodiments are not limited in this regard, such criteria may include a timeout condition, a loss of signal, or another such criteria. Another criteria may include additional detected information such as a level measured by a second peak detector, as discussed above. If it is determined that such criteria are met, control passes back to block 710 discussed above for returning to the rural mode. Otherwise, control passes to block 750 where operation of the wireless device in the urban mode is maintained.

Still with reference to FIG. 7, if it is determined that the RF signal level exceeds the second threshold, control passes to block 760 where the wireless device may be configured into a bypass mode. In this bypass mode, the LNA is removed from the signal processing path, as the incoming RF signal is of sufficient strength. In the bypass mode, control passes to diamond 770, where it may be determined whether the RF signal is less than a third threshold, which may be at a different level than the other thresholds. Note that in the bypass mode, the detection of the RF signal may occur at an input (and/or output) to the filter, as there is no LNA in the receive signal processing path.

If it is determined that the RF signal level exceeds this third threshold, operation in the bypass mode is maintained (block 780). Otherwise, when it is determined that the RF signal level falls below the third threshold, control passes to diamond 790 to determine whether one or more criteria for return to another mode have been met. Such criteria may be as discussed above (such as timeout period, loss of signal or so forth). If such one or more criteria have been met, control passes to diamond 795 to determine whether the wireless device is to be configured back into the urban or rural mode.

Understand that while in FIG. 7 a method is disclosed for dynamically reconfiguring a wireless device to operate in one of three modes, embodiments are not so limited. That is, in other cases a wireless device may be configured for more than three modes of operation. In still other cases, there may be only two modes such as a given two of the three above-described modes. In such cases, operation may proceed as described in FIG. 7 with the removal of whatever mode is not available.

Embodiments may be used to identify whether transition back to a less protected mode will cause re-occurring of an overload condition. To handle this problem, embodiments may provide a timer-based mechanism having an adaptive timeout period. The timer starts after transitioning to a more protected mode. When a timeout occurs, the controller transitions back to a less protected mode.

The timeout period is based on the duration between transitioning to the less protected mode and the time before the next overload condition is detected. If this time is short, it may indicate a hostile environment (e.g., a frequently present strong adjacent channel), which makes staying longer in the more protected mode more desirable (extending timeout period). Conversely, when the duration between transitioning to the less protected mode and the time before the next overload condition is relatively long, then it may be desirable to reduce the timeout period. Adjusting the timeout period can be done in steps using multiple iterations (multiple transitions from a protected to a less protected mode), which results in a timeout period that is based on averaging over varying channel conditions.

In an urban environment, for example, there could be several nearby transmitters causing strong interference and hence a high probability of needing a protected mode. With an adaptive timeout period, a relatively long timeout period may cause the FEM to stay in the more protected mode relatively longer. This may result in a low probability of packet loss from interference, simply because the FEM does not spend much time in the less protected rural mode.

Conversely, in a rural environment, there may be very few nearby transmitters and hence a low probability of needing a more protected mode. With an adaptive timeout period herein, a relatively short timeout period may cause the FEM to stay in the more protected mode relatively longer. This may result in a relatively low probability of packet loss because of a lag of sensitivity, simply because the FEM does not spend much time in a more protected mode.

Figure 8A:
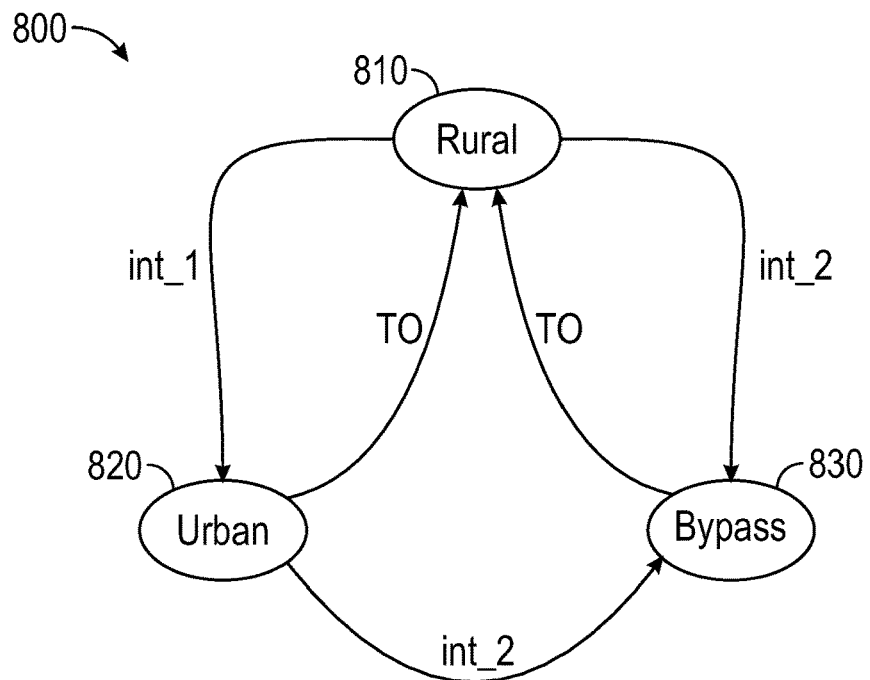
FIGS. 8A-8B are state diagrams of operation in accordance with an embodiment.

Referring now to FIG. 8A, shown is a state diagram of dynamic operation of a wireless device in accordance with an embodiment. As shown in FIG. 8A, state diagram 800 illustrates three available modes in which a wireless device may be configured, namely, a rural mode 810, an urban mode 820, and a bypass mode 830. These various modes and their configurations and operations have been described above. State diagram 800 may be representative of control operations performed by a controller, e.g., of an SoC associated with a front end module having switching circuitry as described herein. Of course in other implementations, a single integrated circuit may include front end circuitry and associated switching circuitry. In yet other implementations, a front end module may include sufficient processing circuitry to implement the operation of state diagram 800 itself.

In any case, as shown in FIG. 8A operation of a wireless device begins in rural mode 810. Then responsive to a given interrupt, the state of the wireless device may transition into a given one of urban mode 820 or bypass mode 830. More specifically, in response to a first type of interrupt (int_1), the wireless device may be reconfigured from rural mode 810 to urban mode 820. In one or more embodiments, this first type of interrupt may be triggered in response to a detection of an RF signal level that exceeds a given threshold, as discussed above.

Thus with reference to this first type of interrupt, when a power level excursion that exceeds a given threshold is detected, the wireless device may be reconfigured to urban mode 820. Thereafter, following a timeout (TO) period, the state may revert back to rural mode 810. In various embodiments as described above, this timeout period may be an adaptive or configurable timeout period. For example, when a duration within rural mode 810 is short (e.g., lower than a target duration), the timeout period may be extended such that operation in urban mode 820 occurs for longer periods of time.

Still referring to FIG. 8A, operation may also pass from rural mode 810 directly to bypass mode 830 in response to another type of interrupt. In one or more embodiments, this second type of interrupt (int_2) may occur when a passive network of a receiver RF signal processing path reaches an attenuation threshold. In one or more embodiments, this second type of interrupt may have higher priority than the first type of interrupt. As such, in response to triggering of both of these interrupts, control passes from rural mode 810 to bypass mode 830, rather than from rural mode 810 to urban mode 820. As illustrated, after completion of a timeout period, control passes from bypass mode 830 back to rural mode 810.

Still with reference to FIG. 8A, when in urban mode 820 and the second type of interrupt is triggered, the state transitions from urban mode 820 to bypass mode 830. Understand while shown with these particular state transitions and modes present in FIG. 8A, variations and alternatives are possible. For example, in some cases a timeout timer may be reset when power exceeds a given threshold. Such timeout resets may occur when residing in one of urban and bypass modes.

Figure 8B:
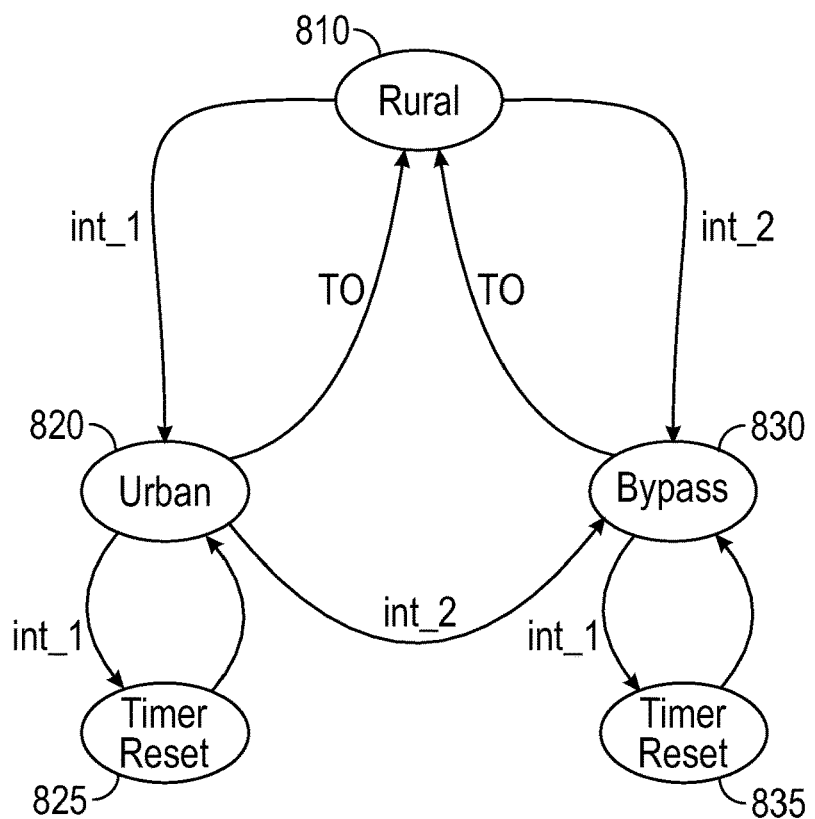

Referring now to FIG. 8B, shown is a state diagram of dynamic operation of a wireless device in accordance with another embodiment. In general, this state diagram operates the same as in FIG. 8A, with the addition of resetting timeout timers when in a given state and detected RF signals are over a given threshold.

Thus as shown in FIG. 8B, when a first type of interrupt is triggered while present in the urban or bypass modes, a timer reset state (825 or 835) occurs in which the timeout timer is reset. In this implementation, note that the return from one of urban or bypass modes to the rural mode may occur when the timeout period has expired and the measured RF power level remains below the given threshold during the timeout period. Otherwise when an RF power level excursion beyond a given threshold occurs in one of these modes, the first type of interrupt is triggered and the timeout timer is reset.

To control the dwell time in a more protected mode, a controller may be configured to compare a target or threshold dwell time value with the time spent in the less protected mode. As one example, if the time spent in rural mode is between the target dwell time and (e.g.) 2*target dwell time then the dwell time in the urban mode (u_dwell timeout) is unchanged. If the time spent in the rural mode is shorter than the target dwell time, indicating significant interference, then the dwell time in urban mode is increased. This reduces the repetition frequency between rural and urban transitions. A packet may be lost during such transition whereas it may have been successfully received if staying in urban mode. If the time spent in the rural mode is longer than 2*target dwell time, indicating no severe interference conditions, then the dwell time in urban mode may be shortened. By doing so, the receiver can spend more time in a more sensitive mode to receive weaker signals.

Figure 9A:
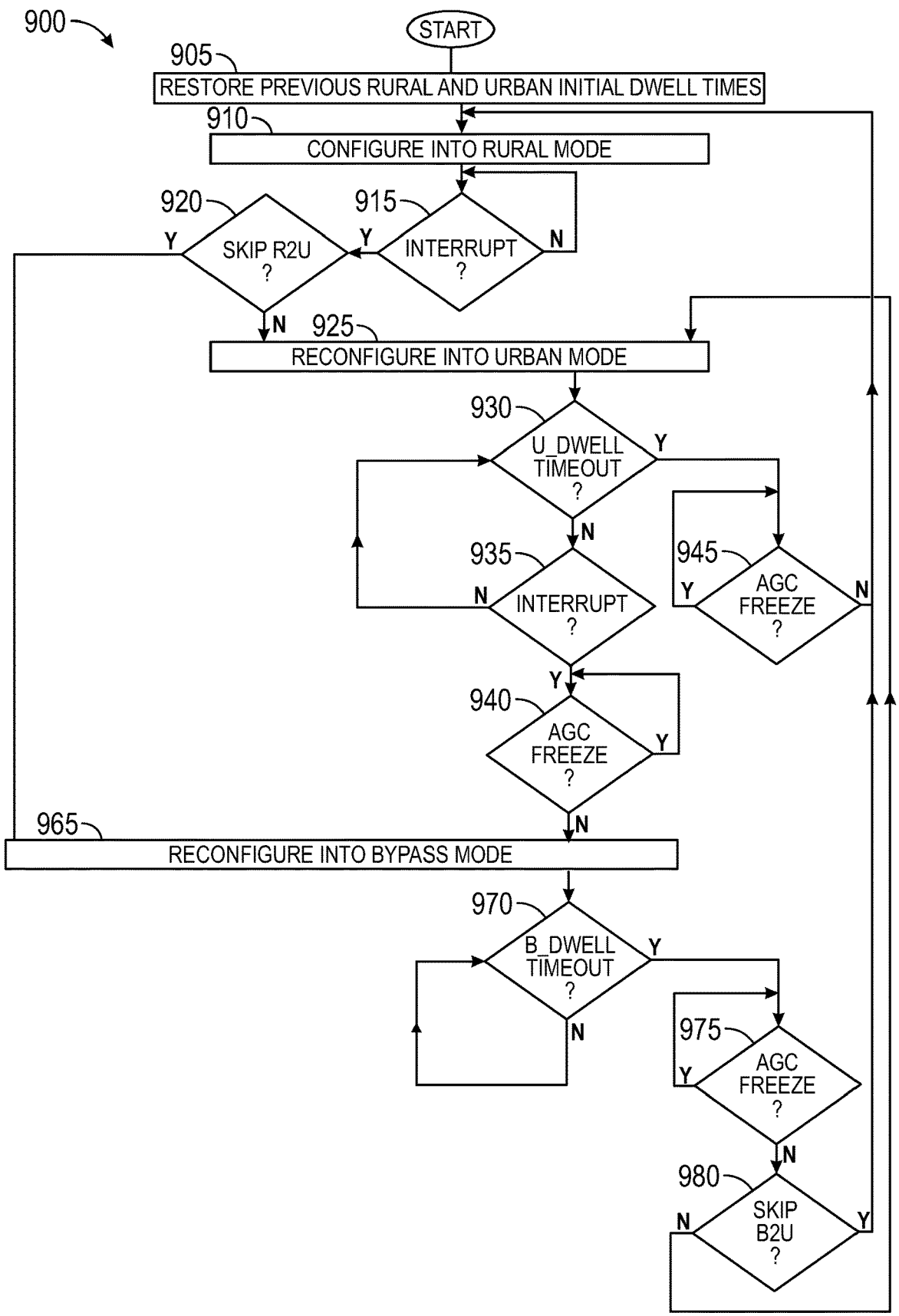
FIGS. 9A-9B are flow diagram of methods in accordance with other embodiments.

Referring now to FIG. 9A, shown is a flow diagram of a method in accordance with another embodiment. More specifically, method 900 of FIG. 9A is a more detailed method for dynamically controlling a front end circuit of a wireless device in accordance with an embodiment. As such, method 900 of FIG. 9A may be performed by hardware circuitry, such as a controller present within the wireless device, e.g., a microcontroller within an SoC, control circuitry within a front end module itself or another processing circuit. The hardware circuitry may execute instructions stored in a non-transitory storage medium such as a non-volatile memory that may be present within the SoC, front end module or other integrated circuit of the wireless device.

As shown in FIG. 9A, method 900 begins when a receiver is enabled and previous initial dwell time values may be restored (block 905). In one or more embodiments, these initial dwell times may be in the form of exponent values that may be used to determine dwell times in urban and bypass modes. In such one or more embodiments, these exponential values may be configured to have an initial value, e.g., seven (which acts as an exponential value when there is no history available). While an exponent is used in this example to change dwell times, in other cases a linear approach may be used. These exponent values thus may determine the (dwell) time in urban and bypass modes (to be controlled to be within minimum and maximum values (E_urban_min and max and E_bypass_min and max, as used in Tables below), with initial values of E=7 when no history is available (E_urban_prev and E_bypass_prev). Also in the Tables below, it may be assumed that a typical packet duration (tpd) is 20 milliseconds (ms), and a target value for duration in a given mode without needing a transition (Target) may be set at 1024 tpd.

As shown in FIG. 9A, control next passes to block 910 where the wireless device (and more particularly the front end module) may be initialized into the rural mode. Various operations may occur for this initialization and configuration into the rural mode, including setting switching circuitry as described herein. In addition, one or more RF level detectors may be initialized, e.g., by discharging filter capacitors. In addition, a duration timer to maintain a duration of operation in the rural mode may be set. Further, an analog comparator that compares a detected RF power level to a given threshold may be enabled to trigger an interrupt in response to a power excursion.

Still referring to FIG. 9A, control next passes during operation in the rural mode to determine whether an interrupt is detected (diamond 915), meaning that a power level has exceeded a threshold. If so, control next passes to diamond 920 to determine whether the urban mode is disabled (which may be based on an enable bit set to indicate a skip of the urban mode). If such enable bit is set to enable this skip, control passes from diamond 920 directly to block 965 for reconfiguration of the wireless device (namely, the front end module) into the bypass mode, as will be described further below.

Otherwise, if there is no skip indicated, control passes from diamond 920 to block 925 where operation of the wireless device (namely the front end module) may be reconfigured into the urban mode. At block 925 various operations may be performed to appropriately reconfigure the front end module to the urban mode, including appropriate setting of switching circuitry. In addition, similar operations discussed above for configuration into the rural mode may be performed. These operations include reading a rural time and updating an urban mode dwell time calculation based at least in part thereon (one example of which is shown in Table 1 below). Further operations include setting a timeout period for the urban dwell time, and starting the timer and resetting an AGC control circuit of the SoC. Accordingly at this point, operation proceeds in the urban mode Referring now to Table 1, shown is pseudocode for performing an update calculation for an urban dwell time duration in accordance with an embodiment. In this pseudocode of Table 1, the above-described parameters can be used.

TABLE 1

Update u_dwell calculation:
- IF rural_time < target THEN E_urban = MIN(E_urban_prev + 1, E_urban_max)
  ELSE IF rural_time > 2 * target THEN E_urban = MAX(E_urban_prev – 1, E_urban_min)
    ELSE E_urban = E_urban_prev
    u_dwell timeout = tpd * 2^E_urban
    store E_urban as E_urban_prev Still referring to FIG. 9A, it may be determined at diamond 930 whether the urban mode dwell time duration has timed out. If so, and an AGC freeze is not active, control passes back to block 910 for returning to the rural mode. Note that the AGC freeze is an indication that changes to AGC circuitry are stalled in response to detection of a valid packet. In this way, embodiments may be configured to prevent mode changes while a valid packet is being received, to avoid possible disruption to the reception. To this end, a controller may check for any detection that indicates that a valid packet is being received. Examples of signals that can be used to check if a valid packet is being received include: timing detection, preamble detection, sync word detection, RSSI, AGC activity, or so forth. If there is an indication that a valid packet is received, the controller may wait until the packet is received, or use a timeout and transition after the timeout. In an embodiment, a AGC control circuit may be prevented from updating AGC settings (a so-called AGC freeze as shown in FIG. 9A) when a valid packet is detected.

If the urban mode dwell time duration has not passed, it may next be determined at diamond 935 whether an interrupt is received. If so, and there is no AGC freeze (as determined at diamond 940), control passes to block 965 for reconfiguration into the bypass mode. At block 965, operations to reconfigure the FEM into the bypass mode may include reading an urban timer, updating a bypass mode dwell calculation (e.g., in accordance with Table 2 below), setting a timeout period for the bypass dwell time, and starting the timer and resetting the AGC control circuit.

Referring now to Table 2, shown is pseudocode for performing an update calculation for a bypass dwell time duration in accordance with an embodiment. In this pseudocode of Table 2, the above-described parameters can be used.

TABLE 2

Update b_dwell calculation :
- IF urban_time < target THEN E_bypass = MIN(E_bypass_prev + 1, E_bypass_max)
  ELSE IF urban_time > 2 * target THEN E_bypass = MAX(E_bypass_prev – 1, E_bypass_min)
    ELSE E_bypass = E_bypass_prev
    b_dwell timeout = tpd * 2^E_bypass
    store E_bypass as E_bypass_prev Still with reference to FIG. 9A, when in operation in the bypass mode, it may be determined at diamond 970 whether the bypass mode dwell time duration has timed out. If so, and there is no AGC freeze (as determined at block 975), control passes to a selected one of the urban or rural modes depending on whether the skip from the bypass to the urban mode is active (as determined at diamond 980).

Understand while shown at this high level in the embodiment of FIG. 9A, many variations and alternatives are possible. For example, dynamic updates to urban and dwell timeout periods may occur, and further may only occur when it can be established that a given mode transition is not linked to a desired packet (which may be determined based on preamble detection and timing information). In this way, dwell time adaptations may be excluded when transitions are potentially the result of receipt of a high power desired packet.

Overload conditions that trigger transitions may be handled the same way (as described in FIG. 9A), regardless whether they are caused by interference or desired packets. Just like strong interference, a strong desired packet may also push the power level over the detection threshold. If this happens shortly after transitioning to a less protected mode, then that will likely result in a longer dwell timeout calculation, the same way it would when receiving a strong interferer. A desired signal could potentially be received successfully, even when the FEM is transitioning to a more protected mode during the reception of preamble. So, it may not be needed to increase the dwell time based on the timings of a desired signal.

To this end, it may be determined whether transition to a more protected mode can be linked to a desired signal. In one or more embodiments, this determination may be performed by considering preamble detection. When the transition is related to a desired packet, one can expect the preamble to be detected within a certain period (RXpdt) after the transition. Instead of preamble detection, one could use many other detection signals, for example, sync word detection, timing detection, AGC freeze detection, or so forth. The timings of these signals may be different than the preamble detection time out (RXpdt), so adjustments to this time may be based on what signal or signal combination is used.

If the transition can indeed be linked to a desired packet (x_dwell<RXpdt), then the dwell timeout remains unchanged. However when the transition cannot be linked to a desired signal (x_dwell≥RXpdt), then the x_dwell timeout may be recalculated based on the time spent in the less protected mode preceding the transition to the current more protected mode. In this way, desired packets may be excluded from determining the dwell timeouts.

Figure 9B:
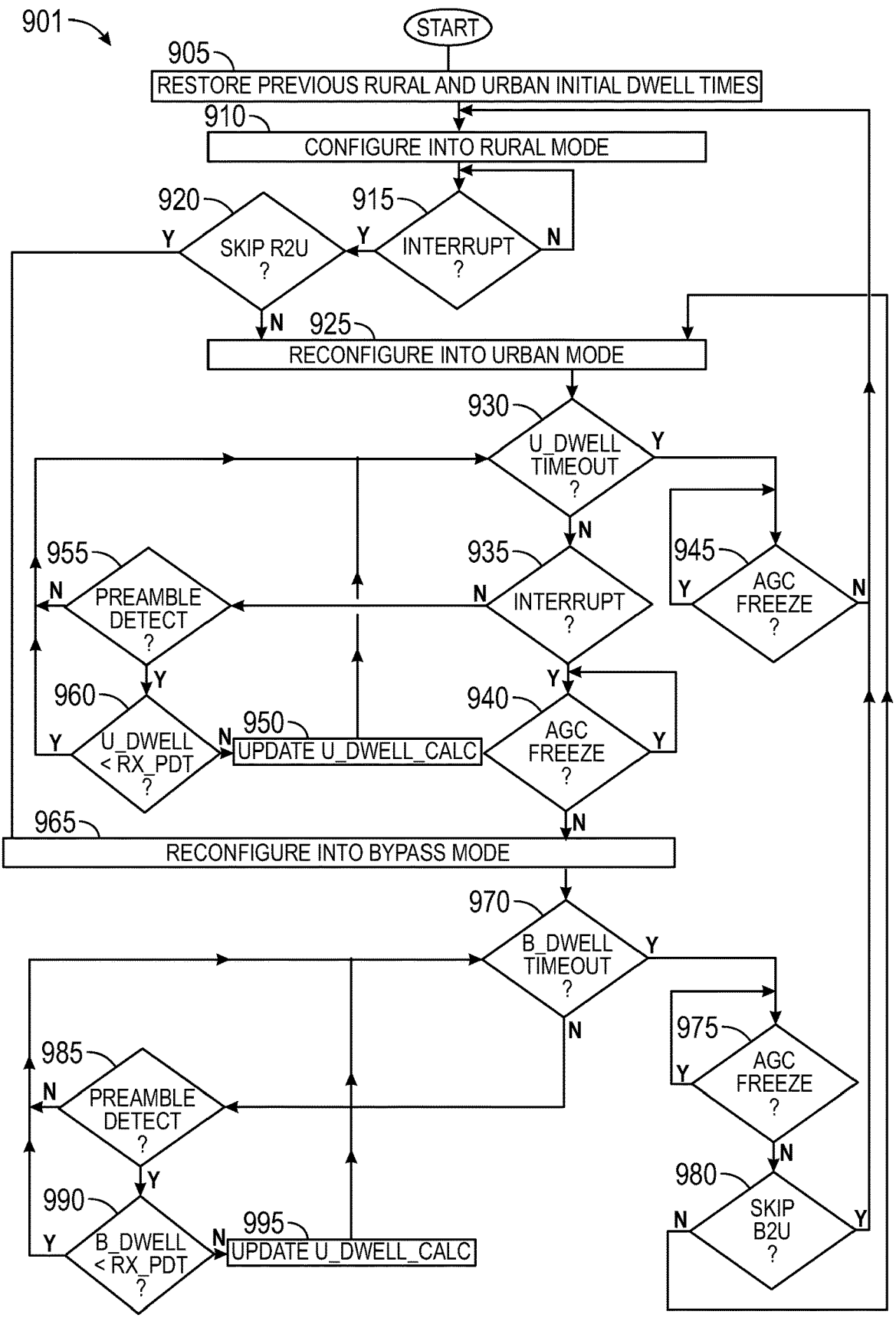

Referring now to FIG. 9B, shown is a flow diagram of a method in accordance with another embodiment. Method 901 of FIG. 9B is generally the same as method 900 of FIG. 9A, and common elements are not discussed. Instead, the following discussion relates to further dynamic updates to dwell times depending on whether mode transitions are caused by desired signal detections.

Thus in this implementation, when a preamble is detected when in an urban or bypass mode (as determined at diamonds 955 and 985), it next may be determined (diamonds 960 and 990) whether the current time duration in the relevant mode (either in the urban mode or the bypass mode) is less than a receiver preamble-to-detection timeout (Rx_pdt), which may be used to determine whether a transition is caused by a desired signal. If the current duration in the given mode exceeds this value of the preamble detection timeout, the relevant dwell timeout period may be updated (at one of blocks 950 and 995). In other aspects, operation of method 901 may be the same as discussed above for method 900 of FIG. 9A. Of course, variations and alternatives are possible.

In some use cases it is possible to configure a wireless device when implemented in a particular environment in the field into a fixed mode. For example, assume a wireless device such as a smart meter or so forth is installed into a rural environment. When installed, the wireless device, although having multiple modes available, may be statically configured, e.g., by way of firmware, to be affixed into the rural mode. However over time as to the nature of the environment changes and additional development occurs, this rural location may have many more wireless devices present, such that some amount of interference by way of blockers occurs. As such the rural mode may no longer be the most appropriate mode for operation of the initially present wireless device.

Figure 10:
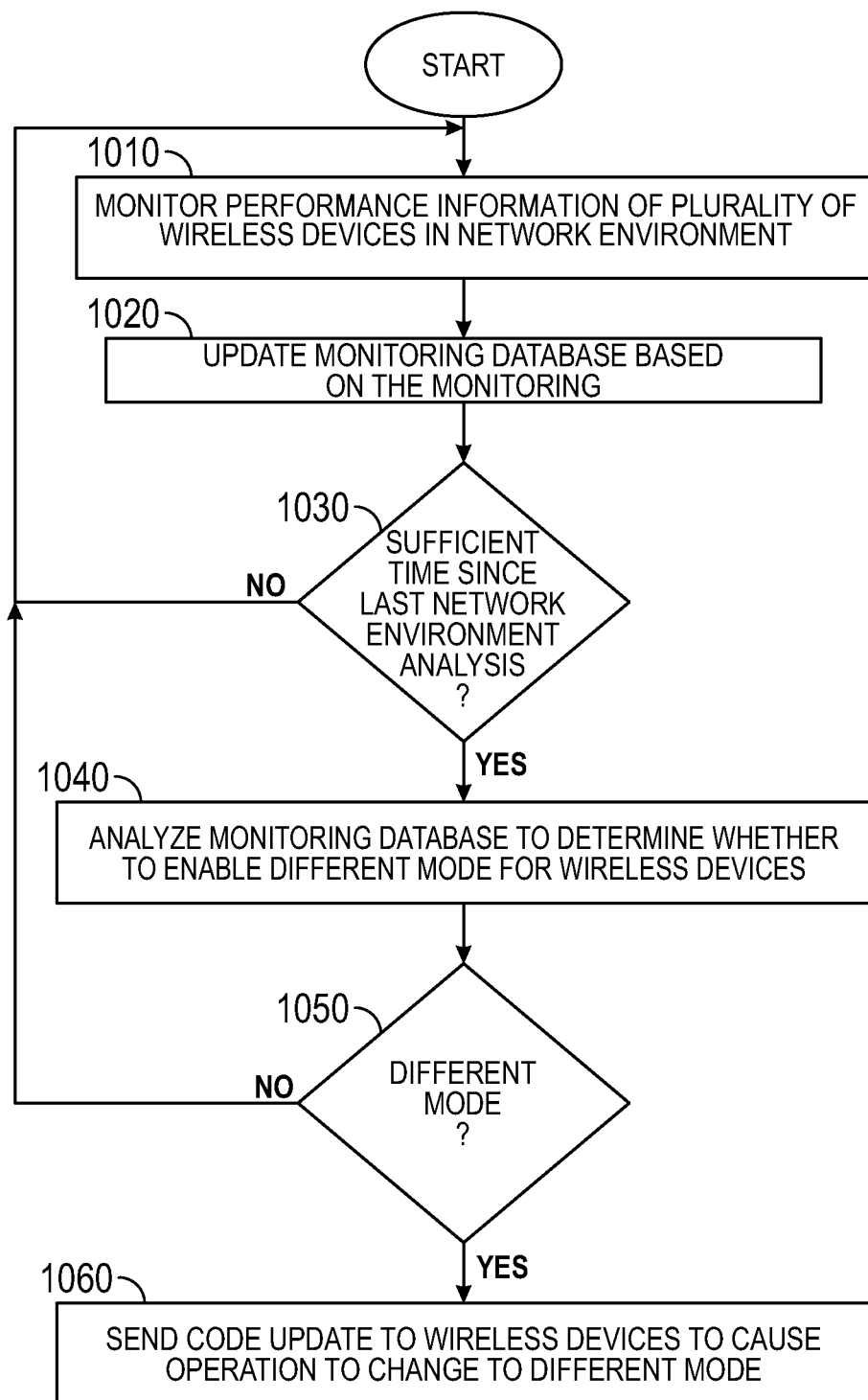
FIG. 10 is a flow diagram of a method in accordance with yet another embodiment.

Referring now to FIG. 10, shown is a flow diagram of a method in accordance with yet another embodiment. More specifically, FIG. 10 illustrates a method 1000 for monitoring a network environment over a period of time and identifying when a nature of that network environment has sufficiently changed to cause selected wireless devices to be configured for operation in a different static mode.

In an embodiment, method 1000 may be performed by a central control entity, such as a central server, e.g., of a service provider that maintains a number of wireless devices such as smart meters. As such, method 1000 may be performed by hardware circuitry such as may be present in one or more cloud servers. These cloud servers may include processors, memories or other storages, network interfaces, and non-volatile memories (e.g., to store instructions for execution of method 1000).

As illustrated, method 1000 begins by monitoring performance information of wireless devices in the network environment (block 1010). For example, the network environment may be a wireless mesh network such as present in a given neighborhood in which each home has at least one smart meter with a wireless device including switching circuitry and so forth as described herein. The performance information may be, in an embodiment, one or more signal quality metrics, such as one or more of number of retransmissions, number of payload errors, number of frame checksum (FCS) errors, number of cyclic redundancy check (CRC) errors, RSSI, SNR, blocking signal information or so forth. In some cases, the performance information also may include network performance information such as latency data regarding latency of communications (e.g., based on retransmissions or in another manner) between the central server and the wireless devices. Note that this monitoring may occur on an iterative basis, e.g., on a monthly, annual or other relatively long term basis.

Control next passes to block 1020 where a monitoring database may be updated based on the monitoring. For example, a single entry may be provided to include an overall quality metric or there may be multiple entries, each associated with a wireless device and storing some type of signal quality information or other performance information. Control next passes to diamond 1030 to determine whether sufficient time since the last network analysis has occurred. As described above, this may be a relatively long duration. If not, control passes back to block 1010 for further monitoring of the network environment.

If it is determined that sufficient time has elapsed, control passes to block 940 to analyze the monitoring database to determine whether the wireless devices should be caused to enter into a different operating mode. For example, with the assumptions above of wireless devices initially configured into a rural mode, the performance information over time may indicate a degradation, e.g., due to the increased number of wireless devices present in the environment.

The determination at diamond 1050 may be used to initiate a configuration update to a different mode. Control thus passes in this instance to block 1060. At block 1060 the central server may send a code update to the wireless devices in this network environment. For example, the cloud server may send an over-the-air firmware update. This update may include code to cause a controller of each of the wireless devices in the network environment to re-configure from the rural mode to the urban mode. Understand while discussed with this particular example, of course, re-configurations between other modes also may occur using method 1000.

For example, in one implementation the network environment can be segmented into different segments or portions (e.g., based on physical location), which can be independently monitored and controlled. In this way, an update may be performed first to one or more wireless devices in a first portion. Additional monitoring and analysis may then be performed for these updated wireless devices to confirm that a given update (e.g., code update) results in acceptable levels of performance. And, once such improved performance is confirmed the central server may cause additional wireless devices, e.g., in one or more additional portions of the network environment to be updated. In further embodiments, the dynamic updates described herein may be performed on an individual wireless device basis when it is determined that performance of an individual wireless device has degraded (e.g., below a given threshold).

Figure 11:
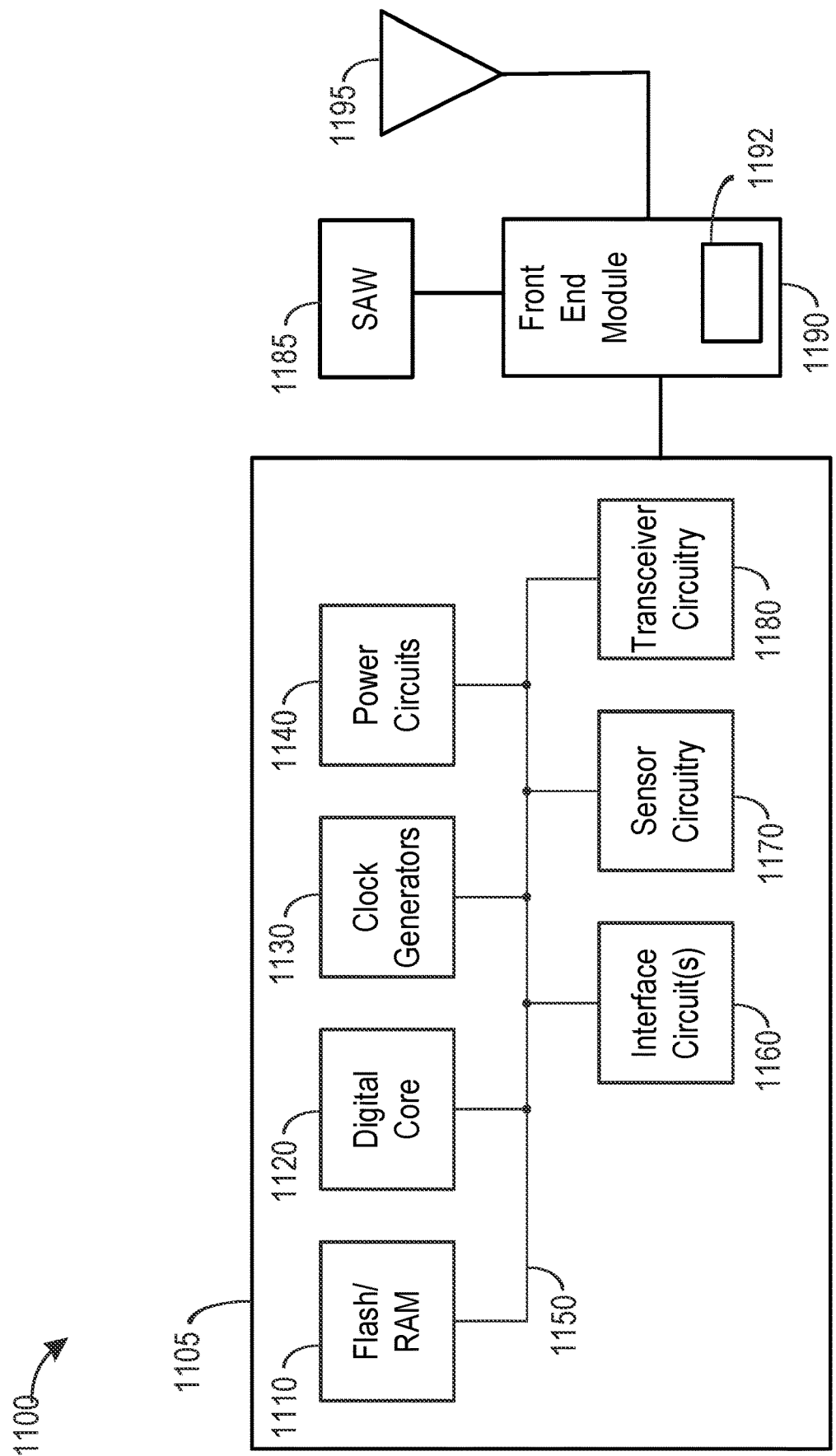
FIG. 11 is a block diagram of a representative IoT device that incorporates an embodiment.

Embodiments may be implemented in many different devices. Referring now to FIG. 11, shown is a block diagram of a representative IoT device 1100 in accordance with an embodiment. In the embodiment shown in FIG. 11, IoT device 1100 may be any connected device to provide a variety of different functionality. In the high level shown in FIG. 11, IoT device 1100 includes an integrated circuit 1105, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device. In turn, integrated circuit 1105 couples to a front end module 1190 including switching circuitry 1192 and further to an off-chip filter 1185. In embodiments, switching circuitry 1192 may be controlled to enable operation in a given one of multiple available receive modes, either statically or dynamically, as described herein.

In the embodiment shown, integrated circuit 1105 includes a memory system 1110 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for generating control signals (e.g., in the form of the front end mode control signals discussed above) for use in controlling switching of switching circuitry 1192 as described herein.

Memory system 1110 couples via a bus 1150 to a digital core 1120, which may include one or more cores and/or microcontrollers that act as a main processing unit of the integrated circuit. In turn, digital core 1120 may couple to clock generators 1130 which may provide one or more phase locked loops or other clock generator circuitry to generate various clocks for use by circuitry of the IC.

As further illustrated, IC 1105 further includes power circuitry 1140, which may include one or more voltage regulators. Additional circuitry may optionally be present depending on particular implementation to provide various functionality and interaction with external devices. Such circuitry may include interface circuitry 1160 which may provide interface with various off-chip devices, sensor circuitry 1170 which may include various on-chip sensors including digital and analog sensors to sense desired signals, such as for a metering application or so forth.

In addition as shown in FIG. 11, transceiver circuitry 1180 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth via connection to front end module 1190, in turn coupled to an antenna 1195. Understand while shown with this high level view, many variations and alternatives are possible.

Note that an IoT device leveraging an embodiment may be, as two examples, an IoT device of a home or industrial automation network or a smart utility meter for use in a smart utility network, e.g., a mesh network in which communication is according to an IEEE 802.15.4 specification or other such wireless protocol.

Figure 12:
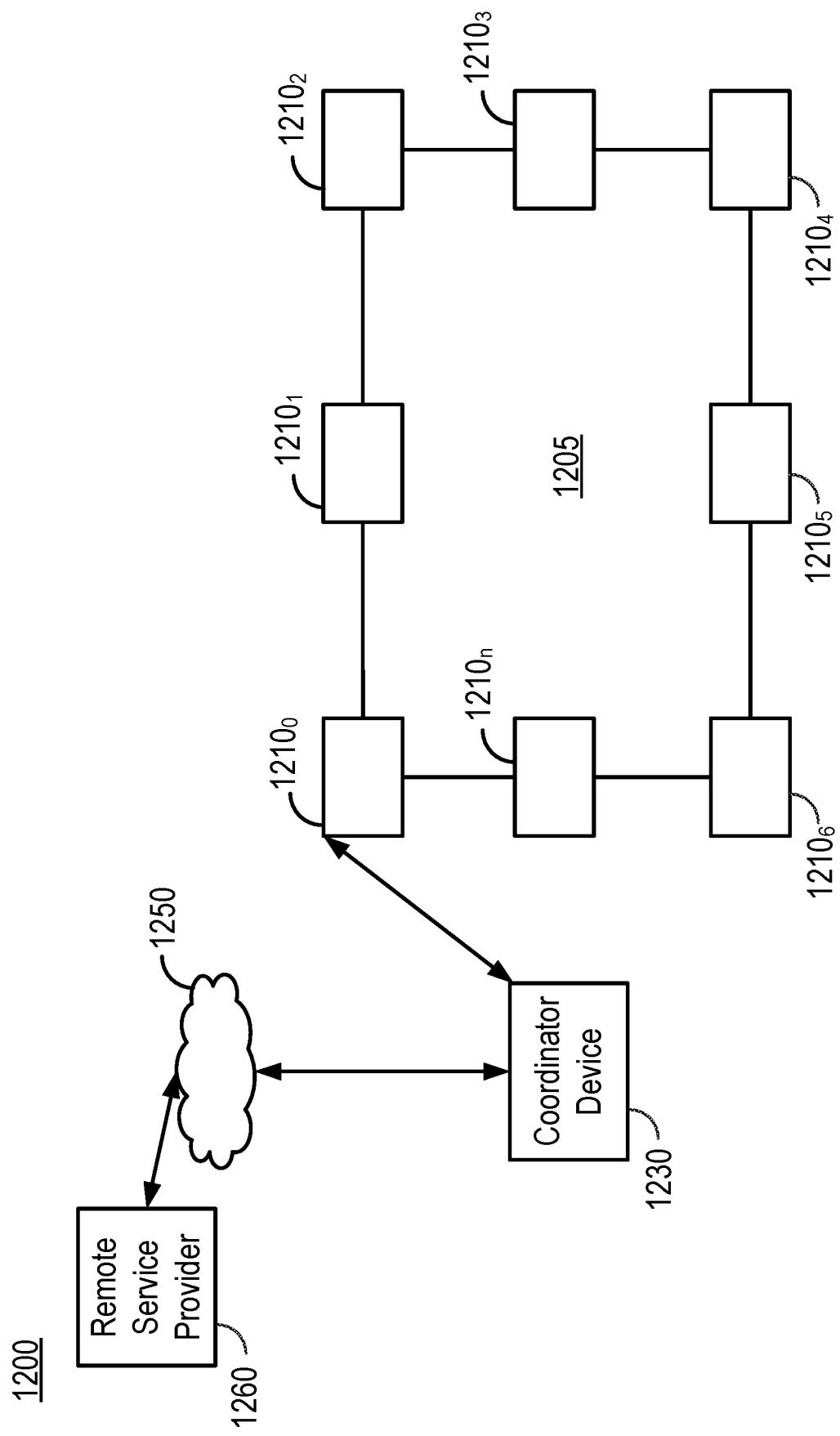
FIG. 12 is a high level diagram of a network in accordance with an embodiment.

Referring now to FIG. 12, shown is a high level diagram of a network in accordance with an embodiment. As shown in FIG. 12, a network 1200 includes a variety of devices, including smart devices such as IoT devices, coordinator devices and remote service providers. In the embodiment of FIG. 12, a mesh network 1205 may be present, e.g., in a neighborhood having multiple IoT devices $1210_{0-n}$ such as smart meters.

Such IoT devices may include switching circuitry as described herein, to enable controllable operation in a given one of available transmit and receive modes. As shown, at least one IoT device 1210 couples to a coordinator device 1230 that in turn communicates with a remote service provider 1260 via a wide area network 1250, e.g., the internet.

In an embodiment, remote service provider 1260 may include one or more backend servers that can be used in provisioning and managing communication with IoT devices 1210. Such backend server may include one or more processors, memories, storage, interface circuitry and so forth, to enable interaction within network 1200. And remote service provider 1260 may perform the long term network analysis and update of operation modes of one or more IoT devices 1210 based on this historical analysis of performance, such as described in FIG. 10 above. Understand while shown at this high level in the embodiment of FIG. 12, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A non-transitory storage medium comprising instructions that, when executed, cause a device to perform a method comprising:
   receiving, in a controller of a wireless device, at least one of a first interrupt or a second interrupt, wherein:
     the first interrupt is to indicate that a receive radio frequency (RF) signal received in a front end circuit of the wireless device is overloading at least a low noise amplifier (LNA) of the front end circuit; and
     the second interrupt is to indicate that the receive RF signal is overloading at least a passive network of a system on chip (SoC) of the wireless device; and
   in response to the at least one of the first interrupt or the second interrupt, reconfiguring the front end circuit from a first mode into a second mode, wherein a relative order of at least two components of a receiver RF signal processing path is different in the first mode than in the second mode.

2. The non-transitory storage medium of claim 1, wherein the method further comprises in response to the first interrupt, reconfiguring the front end circuit from the first mode comprising a rural mode in which an input to the LNA is coupled an antenna to a second mode comprising an urban mode in which the input to the LNA is coupled to an RF filter.

3. The non-transitory storage medium of claim 2, wherein the method further comprises:
   receiving, in the controller of the wireless device, the second interrupt when the front end circuit is in the second mode; and
   in response to the second interrupt, reconfiguring the front end circuit from the second mode to a third mode comprising a bypass mode in which the LNA is bypassed.

4. The non-transitory storage medium of claim 1, wherein the method further comprises in response to the second interrupt, reconfiguring the front end circuit from a rural mode in which an input to the LNA is coupled an antenna to a third mode comprising a bypass mode in which the LNA is bypassed.

5. The non-transitory storage medium of claim 1, wherein the method further comprises receiving the first interrupt from a comparator, the comparator to generate the first interrupt when power level information regarding the receive RF signal exceeds a first threshold.

6. The non-transitory storage medium of claim 1, wherein the method further comprises receiving the second interrupt when power level information regarding the receive RF signal received from a detector coupled to the passive network exceeds a second threshold.

7. The non-transitory storage medium of claim 1, wherein the method further comprises in response to receiving the first interrupt and the second interrupt, prioritizing the second interrupt, and reconfiguring the front end circuit from the first mode to a third mode in which the LNA is bypassed.

8. The non-transitory storage medium of claim 1, wherein the method further comprises:
   receiving, in the controller of the wireless device, the first interrupt when the front end circuit is in the second mode;
   in response to the first interrupt, resetting a timeout period; and
   after the timeout period, reconfiguring the front end circuit from the second mode to the first mode.

9. A method comprising:
configuring a front end circuit of a wireless device into a first mode in which a low noise amplifier (LNA) is included in a receiver radio frequency (RF) signal processing path;
reconfiguring the front end circuit into a second mode in which the LNA is bypassed, based at least in part on an overload condition in an RF circuit of a system on chip (SoC) of the wireless device, the RF circuit of the SoC coupled to receive a receive RF signal from the front end circuit; and
reconfiguring the front end circuit into a third mode in which the LNA is located at a different relative position in the receiver RF signal processing path than in the first mode, based at least in part on an overload condition in the front end circuit.

10. The method of claim 9, further comprising reconfiguring the front end circuit from the second mode to the first mode after a timeout period.

11. The method of claim 9, further comprising:
receiving, in a controller of the SoC, a first interrupt in response to the power level of the receive RF signal exceeding a first threshold; and
reconfiguring the front end circuit into the third mode in response to the first interrupt.

12. The method of claim 9, further comprising:
receiving, in the SoC, a power level of the receive RF signal and in response to the power level of the receive RF signal exceeding a first threshold, reconfiguring the front end circuit from the first mode into the third mode in which an input of the LNA is coupled to a RF filter of the receiver RF signal processing path; and
receiving, in the SoC, the power level of the receive RF signal and in response to the power level of the receive RF signal exceeding a second threshold different from the first threshold, reconfiguring the front end circuit from the third mode into the second mode.

13. The method of claim 9, wherein configuring the front end circuit into the first mode comprises causing an input of the LNA to be coupled to an antenna.

14. A wireless device comprising:
a first integrated circuit comprising a radio frequency (RF) front end module, the RF front end module comprising:
a transmit path to receive, process and output a transmit RF signal, the transmit path comprising a power amplifier;
a receive path to receive, process and output a receive RF signal, the receive path comprising a low noise amplifier (LNA);
switching circuitry coupled to the transmit path and the receive path;
a control circuit coupled to the switching circuitry, the control circuit to control the switching circuitry to configure the receive path for operation in one of a plurality of modes; and
a second integrated circuit coupled to the first integrated circuit, the second integrated circuit comprising a controller to:
in response to a first interrupt, configure the receive path of the first integrated circuit into a second mode in which the receive path has a second sensitivity level;
maintain a timeout time during operation in the second mode; and
after the timeout time, reconfigure the receive path of the first integrated circuit from the second mode to a first mode having a first sensitivity level, the first sensitivity level greater than the second sensitivity level.

15. The wireless device of claim 14, wherein the controller is to cause the control circuit to configure the receive path for the operation in the second mode in response to an overload of the LNA, wherein in the second mode the receive path comprises an RF filter having an output coupled to an input of the LNA.

16. The wireless device of claim 15, wherein the controller is to receive the first interrupt to indicate the overload of the LNA, the second integrated circuit comprising a comparator to compare a power level of the receive RF signal to a comparison signal and generate the first interrupt in response to the power level of the receive RF signal exceeding the comparison signal.

17. The wireless device of claim 14, wherein the controller is to cause the control circuit to configure the receive path for the operation in a third mode in which the LNA is bypassed in response to an overload of an RF circuit of the second integrated circuit.

18. The wireless device of claim 17, wherein the controller is to receive a second interrupt to indicate the overload of the RF circuit, the second integrated circuit comprising a detector coupled to the RF circuit to detect the overload of the RF circuit and generate the second interrupt in response to the detection of the overload of the RF circuit.

19. The wireless device of claim 14, wherein the controller, in response to:
the first interrupt, is to configure the receive path for the operation in the second mode in which the LNA is coupled to receive the receive RF signal from an RF filter;
a second interrupt, is to configure the receive path for the operation in a third mode in which the LNA is bypassed; and
the first interrupt and the second interrupt, is to configure the receive path for the operation in the third mode.

* * * * *